(12) United States Patent
Klemba et al.

(10) Patent No.: US 8,775,450 B2
(45) Date of Patent: Jul. 8, 2014

(54) SYSTEMS AND METHODS FOR INFORMATION EXCHANGE USING OBJECT WAREHOUSING

(75) Inventors: Keith S. Klemba, Palo Alto, CA (US); Matthias U. Kaiser, Mountain View, CA (US); Shuyuan Chen, Palo Alto, CA (US); Frances H. James, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1757 days.

(21) Appl. No.: 11/788,406

(22) Filed: Apr. 19, 2007

(65) Prior Publication Data

US 2008/0263086 A1 Oct. 23, 2008

(51) Int. Cl.
*G06F 17/30* (2006.01)
(52) U.S. Cl.
USPC ......................................... 707/758
(58) Field of Classification Search
USPC ..................... 707/688, 690, 758, 999.006
See application file for complete search history.

(56) References Cited

U.S. PATENT DOCUMENTS

| | | | |
|---|---|---|---|
| 5,691,917 A | 11/1997 | Harrison | |
| 5,774,729 A | 6/1998 | Carney et al. | |
| 5,802,263 A * | 9/1998 | Dittmar et al. | 714/4 |
| 6,334,142 B1 * | 12/2001 | Newton et al. | 709/206 |
| 6,757,712 B1 * | 6/2004 | Bastian et al. | 709/206 |
| 7,035,634 B2 * | 4/2006 | Mead et al. | 455/431 |
| 7,185,046 B2 | 2/2007 | Ferstl et al. | |
| 7,231,428 B2 * | 6/2007 | Teague | 709/206 |
| 7,317,697 B2 | 1/2008 | Lewis et al. | |
| 7,444,383 B2 * | 10/2008 | Horvitz | 709/207 |
| 7,461,382 B2 | 12/2008 | Hammerich et al. | |
| 7,519,602 B2 | 4/2009 | Klemba | |
| 2001/0036822 A1 | 11/2001 | Mead et al. | |
| 2001/0036823 A1 | 11/2001 | Van Lieshout et al. | |
| 2002/0006112 A1 | 1/2002 | Jaber et al. | |
| 2002/0152315 A1 * | 10/2002 | Kagan et al. | 709/228 |
| 2002/0184223 A1 * | 12/2002 | Miura | 707/10 |
| 2003/0041107 A1 | 2/2003 | Blattner et al. | |
| 2003/0087638 A1 | 5/2003 | Taylor | |

(Continued)

FOREIGN PATENT DOCUMENTS

| | | |
|---|---|---|
| EP | 1263233 A2 | 12/2002 |
| JP | 2001-519130 A | 10/2001 |

(Continued)

OTHER PUBLICATIONS

Ziliaskopoulous et al., "An Internet-based Geographic Information System that Integrates Data, Models and Users for Transportation Applications", Transportation Research Part C (Aug. 2000), pp. 427-444.

(Continued)

*Primary Examiner* — Mohammed R Uddin
(74) *Attorney, Agent, or Firm* — Fountainhead Law Group PC

(57) ABSTRACT

Embodiments of the present invention improve information exchange, and in particular, the exchange of data objects between different software systems. In one embodiment, the present invention includes a method of exchanging information comprising analyzing the attributes of the objects. Objects may be stored in a repository and retrieved using attributes. In some applications, objects are received and sent to participants without accessing any information in the objects themselves. Different applications include object warehousing operable across different communication mediums that support different names or name spaces, classes, aliases, groups, geospatial information, or tokens, or combinations thereof.

24 Claims, 16 Drawing Sheets

(56) References Cited

U.S. PATENT DOCUMENTS

| | | |
|---|---|---|
| 2003/0126308 A1 | 7/2003 | Kim |
| 2003/0227392 A1* | 12/2003 | Ebert et al. .............. 340/825.49 |
| 2004/0024849 A1* | 2/2004 | El-Beik ....................... 709/219 |
| 2004/0064516 A1 | 4/2004 | Tsuboi et al. |
| 2005/0065977 A1 | 3/2005 | Benson et al. |
| 2005/0273497 A1 | 12/2005 | Patrick et al. |
| 2006/0015603 A1 | 1/2006 | Jakobson et al. |
| 2006/0031407 A1 | 2/2006 | Dispensa et al. |
| 2006/0069946 A1 | 3/2006 | Krajewski, III et al. |
| 2006/0178997 A1 | 8/2006 | Schneck et al. |
| 2006/0190610 A1 | 8/2006 | Motegi et al. |
| 2007/0073845 A1 | 3/2007 | Reisman |
| 2007/0112811 A1 | 5/2007 | Shen et al. |
| 2008/0263086 A1* | 10/2008 | Klemba et al. ............ 707/103 R |

FOREIGN PATENT DOCUMENTS

| | | |
|---|---|---|
| JP | 2003-530746 A | 10/2003 |
| JP | 2004-110814 A | 4/2004 |
| JP | 2005-528052 A | 9/2005 |
| WO | 98/47268 A1 | 10/1998 |
| WO | 00/14987 A1 | 3/2000 |
| WO | 02/35359 A2 | 5/2002 |
| WO | 03/100640 A1 | 12/2003 |
| WO | 2006/063868 A1 | 6/2006 |

OTHER PUBLICATIONS

Durr et al, "SITS: A System for Uniform Intermodal Freight Transport Information Exchange", International Journal of Transport Management, Dec. 1, 2003, pp. 175-186.

European Search Report (from a corresponding foreign application), EP 07024166.6, mailed Aug. 1, 2008.

Office Action from corresponding Japanese application, 2008-99629, issued Feb. 22, 2011.

K. Jeffay, DL Stone, "Accounting for Interrupt Handling Costs in Dynamic Priority Task Systems," Proceedings of the 14th IEEE Real-Time Systems, 1993, pp. 1-10.

* cited by examiner

820 Participant IDs

| | Name Form | Name |
|---|---|---|
| 801 | IPv4 Address | 216.15.20.31 |
| 802 | doi | 10.1038/35057062 |
| 803 | URL | http://www.sap.com/file.mp3 |
| 804 | NADS | +1-650-555-1234 |

811, 812

800

840 Tags

| | Identity | Class | A | OW |
|---|---|---|---|---|
| 851 | 7000.33345 | Car | 5 | 17 |
| 852 | 6444.11121 | Doc | 21 | 17 |
| 853 | 6000.00144 | Music | 0 | 18 |
| 854 | 4332.00464 | Phone | 7 | 18 |

SYSTEMS AND METHODS FOR INFORMATION EXCHANGE USING OBJECT WAREHOUSING

BACKGROUND

The present invention relates to computer software applications, and in particular, to systems and methods for information exchange using object warehousing.

Data moves between software systems to support an ever increasing number of applications. Data varies in type, size, frequency, and format. Classically, the movement of data has been treated as a data distribution model supported by a communication network. This approach has worked in environments that provide underlying features such as a common and unified namespace, fixed or stable address space, persistent and reliable communication channels, and homogeneous deployment schemes. Unfortunately, these features are not always present in modern data communication systems.

For example, a mobile system such as a vehicle may not be able to support the traditional foundational requirements that enable seamless information exchange. Given the 10 to 15 year lifespan of a vehicle, even a modest sized fleet will have vehicles that span several technological and regulatory eras. For instance, some vehicles may have Component Area Network (CAN) 2.0 technology, while others may have simple common wired components. However, vehicles and other wireless systems (i.e., mobile devices) have inherent coverage limitations that, in turn, lead to handoffs, name changes, and address changes over time. Moreover, many modern wireless devices are not always turned on, making the network availability of the device difficult to determine for the purposes of information exchange.

One solution to the problem of information exchange is to include a buffering system between software applications. A buffer may be used so that the sender fills the buffer and the receiver empties the buffer. The sending and retrieving actions may be displaced in time, allowing different systems to exchange information without a direct communication link between the sender and receiver. Examples of buffering systems include email, instant messaging, voice mail, and message queues. In these types of systems an apparatus is placed between the sender and receiver where messages can be buffered until the recipient is ready to receive them. However, many existing solutions overlay a unique name space and data model. The buffering component is uniquely aware of both the name space conventions as well as the specific domain data model, making contemporary information exchange systems rigidly tied to the underlying implementations.

What is needed is a flexible system capable of supporting intermittent connectivity, changing addresses, namespace mismatches, different communication mediums, or the growing need for security, for example, or a combination of such issues.

Thus, there is a need for improved systems and methods for exchanging information. The present invention solves these and other problems by providing improved systems and methods for information exchange using object warehousing.

SUMMARY

Embodiments of the present invention improve information exchange, and in particular, the exchange of data objects between different software systems. In one embodiment, the present invention includes a method of exchanging information that includes analyzing the attributes of the objects. Objects may be stored in a repository and retrieved using attributes. In some applications, objects are received and sent to participants without accessing any information in the objects themselves. Different applications include object warehousing operable across different communication mediums that support different names or name spaces, classes, aliases, groups, geospatial information, or tokens, or combinations thereof.

In one embodiment, the present invention includes a computer-readable medium containing instructions for controlling a computer system to perform the methods described herein.

The following detailed description and accompanying drawings provide a better understanding of the nature and advantages of the present invention.

BRIEF DESCRIPTION OF THE DRAWINGS

FIG. 8 illustrates example attribute information according to another embodiment of the present invention.

DETAILED DESCRIPTION

Described herein are techniques for exchanging information. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
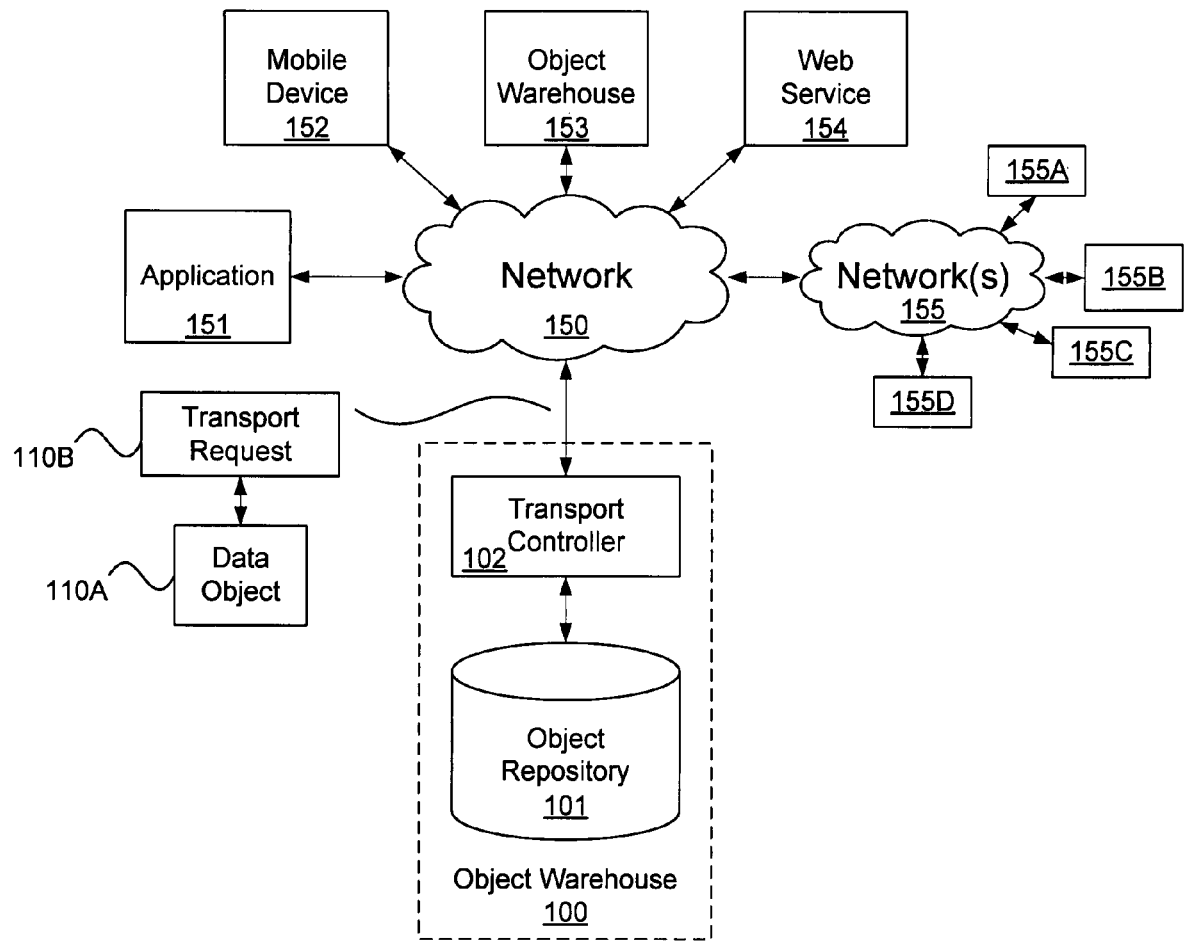
FIG. 1 illustrates an object warehouse according to one embodiment of the present invention.

FIG. 1 illustrates an object warehouse 100 according to one embodiment of the present invention. In one embodiment, object warehouse 100 includes an object repository 101 and transport control software 102. Object warehouse 100 may enable information exchange between a variety of software systems over different networks by providing a controlled mechanism for storing and distributing information as the information is passed between different systems. In some embodiments, software systems may even use object warehouse 100 as place for storing data to be used at another time in the same system. Object warehouse 100 may receive and store information from an application 151, mobile device 152, another object warehouse 153, a software service 154 (e.g., a web service), or any other device or system using software for data communication over network 150. The information stored in repository 101 may be retrieved by only one recipient (i.e., a retrieving entity, retriever, or consumer) or multiple recipients under the control of transport controller 102. For example, stored information may be sent to a single recipient (e.g., another application) when the intended recipient of the information issues an instruction (e.g., a pick up request) to object warehouse 100. Furthermore, transport information (e.g., transport attributes) may be received and stored by object warehouse 100 and used by transport controller 102 in a variety of ways to implement simple or complex policies (e.g., distribution or security rules or algorithms), for example. The policies may be implemented as predefined algorithms that are selected and executed based on information associated with either objects received and stored in the warehouse for distribution or pick up requests received from a retrieving system, or both.

Object warehouses may provide a persistent mechanism for communicating information between software systems. For example, an object warehouse may be located at a fixed address on a network. The address may be known by software systems that use the object warehouse for exchanging information. Each software system may store the address of the object warehouse or multiple object warehouses. Therefore, one software system may exchange information with another software system by sending a data object with a transport request to the address of a particular object warehouse, and the other software system may retrieve the data object by sending a retrieval transport request to the address of the object warehouse, thereby retrieving the data object. Furthermore, in some embodiments the object warehouse may, for example, store identification information for each software system so the object warehouse can determine if a particular software system has any data objects that are designated for pickup for that software system.

In one embodiment, the present invention may distinguish between digital objects (e.g., messages or content) and the transport information for each digital object. Transport information may include instructions (i.e., operations) and attributes for processing the digital objects. Transport instructions are used to specify what actions the object warehouse should perform (e.g., store, retrieve). Each instruction may have a specific workflow for processing a particular digital object. Transport attributes may be used to control how the digital objects are manipulated during a transaction and allow users to specify distribution and security schemes for different digital objects. Object warehouse 100 allows digital objects (also referred to as "data objects") to be stored and manipulated as the data objects are transported between different software systems (or to and from the same software system). Object repository 101 may comprise a variety of different database system configurations including, but not limited to, a single database or multiple databases, and may be managed by one or more database management systems. It is to be understood that other repository technologies could also be used for storing data objects. In one embodiment, data objects 110A may be associated with transport information (transport request 110B). In one example embodiment, transport requests may be implemented as objects ("transport objects"). Transport requests 110B are used by object warehouse 100 to determine how each data object is to be manipulated. As mentioned above, transport requests include instructions used to determine transportation (e.g., delivery) policies to be carried out on the associated data object. The data objects may be included with, or encapsulated in, the transport information. In other embodiments, the transport information may include a reference to the data object (e.g., a pointer or URL for accessing the data object). Additionally, transport requests 110B may include attributes that may be used for processing data objects. Transport controller 102 may receive information in a transport request 110B and perform one or more of a variety of object handling procedures. Transport controller 102 may use the attributes of the transport request in manipulating the associated data object. In one embodiment described in more detail below, data objects 110A specify rules that may be executed by transport controller software 102. Rules may be added dynamically to transport controller 102 for implementing new distribution policy algorithms, security algorithms, or data object processing algorithms. Accordingly, object warehouse 100 may receive data objects, process the data objects according to rules that are either predefined or received from external sources, and/or send the objects in a controlled manner without necessarily accessing the data objects themselves.

In one embodiment, object warehouse 100 includes authentication functionality for maintaining security of data objects. For example, when a data object (or reference) is stored in object repository 101, it may be associated with transport attributes that may be used to specify security protocols that must be met to access the data object. Additionally, security algorithms (rules) may be stored as data objects in the object repository and executed to authenticate requests to access a stored data object. For example, transport attributes may specify an encryption technique used for encrypting the associated data object. In order for an entity (e.g., another software system) to gain retrieval access to the associated data object, it may be required to supply the appropriate encryption key. Accordingly, the software system requesting access to the object may first access the transport attribute specifying the particular encryption scheme. Next, once the software system knows what encryption is being used, it may retrieve the encrypted data object (e.g., by issuing a request to the object warehouse) and use the necessary key (assuming it has the key or can gain access to the key through other means) for decrypting the object. Encryption and decryption may be performed in the object warehouse, for example. As another example, a retrieving entity may be required to be authenticated as follows. First, the retrieving entity may send a request to the object warehouse to retrieve all data objects designated for that entity. The retrieval request may include attributes specifying the entity making the request. If a data object in the object warehouse is designated for the retrieving entity, then before retrieval access to the data object is permitted, the object warehouse may be required to perform an authentication security algorithm based on the attributes of the retrieving entity. A particular security algorithm to be executed may be associated with the data object. The authentication of the retrieving entity may be performed when the retrieval access is attempted. The algorithm may use the attributes received from the retrieving entity as inputs to the algorithm, and may grant or deny access to the data object based on the retrieving entities particular attribute values, for example. If retrieval access is granted, then the data object may be sent back to the retrieving entity. Similarly, attributes on transport requests may be used to authenticate or perform other security algorithms on incoming transport requests with associated data objects before the data objects are allowed to be stored in the repository. It is to be understood that a variety of security features may likewise be defined using attributes associated with the data objects.

Transactions between object warehouse 100 and other software systems may be conducted across a single network 150 or across other networks 155 with other software systems 155A-D. Networks 150 or 155 may include the Internet, telecommunication networks, cellular networks, wide area networks, local area networks, or wireless networks such as an 802.11 network, WiMax network, or satellite for example.

Figure 2A:
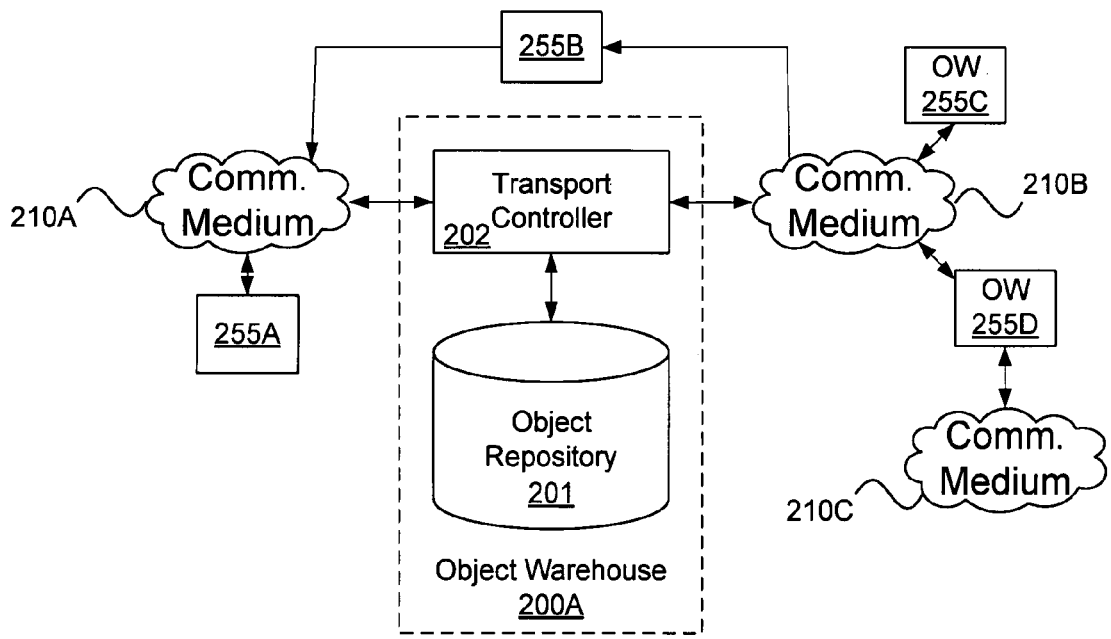
FIG. 2A illustrates object warehousing according to one embodiment of the present invention.

FIG. 2A illustrates object warehousing according to one embodiment of the present invention. More generally, object warehouses may be used across multiple communication mediums to facilitate the flow of information between software systems. For example, a first software system 255A may send and receive information with object warehouse 200A using a first communication medium 210A. A second software system 255B may send information to object warehouse 200A over the first communication medium 210A and receive information from object warehouse 200A over a second communication medium 210B. Some transactions with an object warehouse may be over unidirectional communication channels. An example of such a system may an automobile software system that receives information over a satellite (e.g., digital satellite radio) from an object warehouse, and transmits information to the object warehouse using a wireless communication channel.

In one embodiment, multiple object warehouses 200, 255C, and 255D may be used on the same communication medium (e.g., a network) or across multiple communication mediums to implement a distributed object warehouse. In a distributed object warehouse, each object warehouse may maintain information about the network connectivity of other object warehouses to optimize the flow of information. Object warehouses may be discovered by multicast or registry methods, for example. Warehouses can respond to an internet multicast message or warehouses can register with a recognized central warehouse who maintains and shares the list of active warehouses. Information about the paths between object warehouses may be mapped and distributed to other object warehouses to allow each warehouse to understand the communication mediums available in the distributed warehouse. Clients may select a particular object warehouse in a distributed object warehouse to request service. For example, service may be obtained by selected, learned, directed, or prescribed means. The selected method is where the client selects one of several recommended warehouses to connect with. The learned method is where the client learns that a specific warehouse is better suited to provide the delivery service they would like to request. This is typically a time varying situation hence the learning is ongoing. The directed method is when the client is directed by the recipient to use a specific warehouse. The prescribed method is similar to the selected method but constrained by the communication medium. If the client uses a GPRS connection then a certain warehouse might be prescribed for use with this communication method. For example, one software system (e.g., an application) may send and receive data objects to and from a particular object warehouse in the distributed object warehouse because of network speed or security concerns. Additionally, data objects may be transported between different repositories in a distributed object warehouse based on transport attributes, for example, such as the type of communication medium (e.g., tariffed GPRS, free public WiFi), name space of the transaction (e.g., send this message to all BMWs), or request type (e.g., Duplicate Delivery, Pay on Delivery). Furthermore, distributed object warehouses operating across multiple communication mediums may move data objects between object warehouses to a particular object warehouse that is most convenient for the retrieving software system, for example.

Figure 2B:
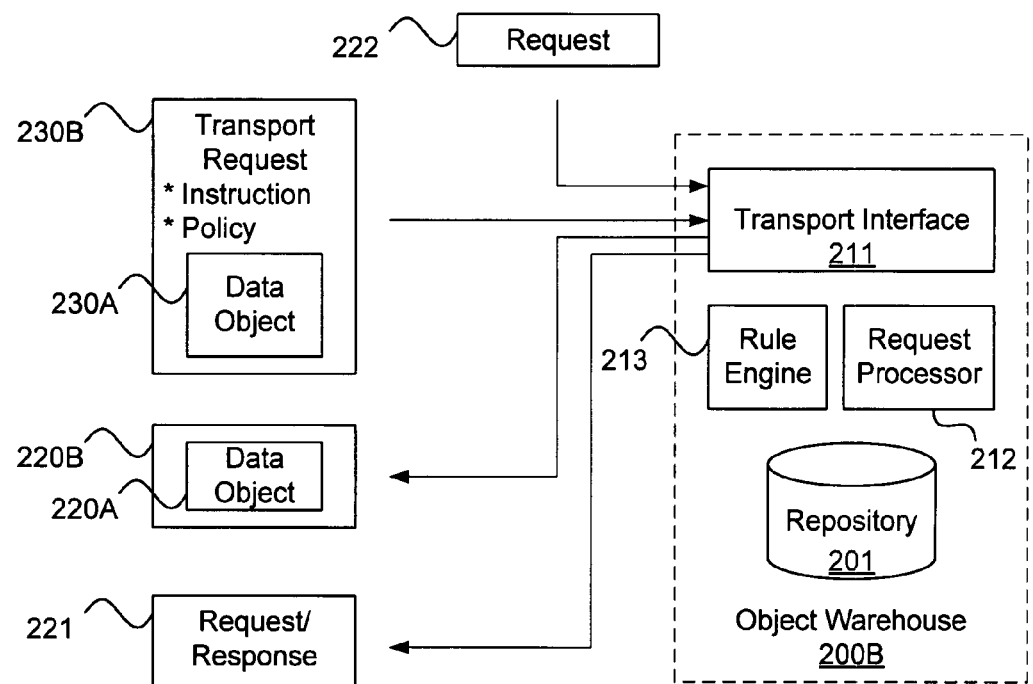
FIG. 2B illustrates an object warehouse according to another embodiment of the present invention.

FIG. 2B illustrates an object warehouse 200B according to another embodiment of the present invention. In this example, object warehouse 200B includes a repository 201, a transport interface 211, a request processor 212, and a rule engine 213. Transport interface 211 receives transport requests with a data object 230B (e.g., store a data object) and without a data object 222 (e.g., retrieve a data object). In this example, transport requests specify an instruction and attributes, including one or more distribution policies. The instruction may include a put or get, for example. Policies may specify one or more predefined distribution policies stored in the object warehouse. Transport requests that contain both instructions (i.e., service requests) and a data object may direct the object warehouse request processor 212 on how to dispatch the data object. The request processor 212 receives transport requests and determines specific workflows or distribution policies to follow for different requests based on the specific instructions, policies, or other attributes of the request, or combinations thereof. Example instructions include, but are not limited to post (store), get (retrieve), connect, disconnect, list, and delete. Instructions may be executed in accordance with workflows or other algorithms that use other transport attributes to determine the distribution or manipulation of data objects.

Furthermore, transport attributes may be stored with each associated data object or a reference to the data object. Attributes may specify distribution policies, which may be stored in the object repository to provide intelligent distribution and/or controlled access to data objects. Distribution policies are predefined algorithms for controlling the distribution of data objects, and may implement security policies by analyzing attributes of retrieval requests to determine what entities can and cannot access particular objects in the object warehouse. Distribution policies may include distribution rules, distribution conditions (e.g., send only after a predefined date), object deletion (destruction) conditions, or specifications of groups or classes of recipients to name just a few. Distribution policies specified in a transport request may access predefined rules (algorithms) stored in the repository and executed by a rule engine 213, for example. Distribution policies may include specifying one or more "retrievers" able to access the data object stored in the object warehouse (e.g., persons, computers, or applications able to retrieve a message). For example, distribution policies may use attributes of a retrieving entity to determine whether or not a data object in the object warehouse is directed toward the entity. Other distribution policies may include multicast information (i.e., specifications of groups the message may be retrieved by), broadcast information (e.g., allowing retrieval of the data object by everyone in a specified domain, class, or list), or replication information, for example. Replication information may include, for example, specifying that the same recipient may retrieve a data object (e.g., a message) 100 times before the message is deleted, multiple consumers (retrievers of the message) may access the message one or more specified times before the message is deleted. In each case, a data object is replicated (copied) as it is retrieved and sent to one or more retrieving entities. Accordingly, data objects may be received in the repository and copies sent to retrieving entities while the data object is maintained in the repository, or data objects may be forwarded to retrieving entities directly and immediately deleted. As is well known by those skilled in the art, there is no material difference between receiving a stored data object or a copy of the stored data object. Using distribution policies and other attributes of the transport request, data objects may be distributed or manipulated according to a variety of attribute values, such as delivery before or after a specified date or time, maximum number of times a data object may be accessed or replicated, deletion of a data object after a certain time period, or delivery of a particular data object to a class of users (e.g., BMW owners), for example. Some embodiments of the present invention allow controlled distribution of data objects (e.g., "content") because the data objects are partitioned from the transport attributes used to control access and distribution to the data objects. Accordingly, example data objects that may be exchanged using an object warehouse include text messages, images, videos, or any other digital representation of information passed from one software system to another (or to and from the same software system) over any communication medium.

As another example of distribution policies, each transport request may include a policy number as one of its attributes. A message may be sent with number and attributes, such as N, X, and Y, for example. One policy number may specify that a message may be retrieved N times by one or more unique entities X, where N and X are provided as attributes in the transport request. Another policy, for example, may specify that a message is to be retrieved N times without regard to a pickup entity, where N is provided as an attribute in the transport request. Another policy may specify that a message is to be retrieved N times to only the specified pickup entity, where N is provided as an attribute in the transport request. Another policy may specify that a message is to be retrieved N times using the Y communication channel, where N and Y are provided in the transport request. Combination of policies may also be specified and used for distribution, for example.

Distribution and manipulation of data objects based on transport attributes may be controlled by rule engine 213. For example, some software systems may benefit from signals being generated by the object warehouse. Algorithms performed by the object warehouse, such as distribution policies and and security procedures, may be implemented by rule engine 213. Rule engine 213 may access rules for implementing the algorithms. The rules may receive attributes as inputs, for example, and may generate and send signals from object warehouse 200B to one or more software systems. For example, data objects 220A may be sent as replies 220B to transport requests (e.g., get). However, requests or replies 221 (e.g., time delayed or automated replies) may be sent with or without data objects to one or more software system automatically based on rules executed in rule engine 213. Any of a variety of rules for manipulating data objects or distribution of data objects based on stored transport attributes may be specified. New algorithms may be added using an object warehouse administrative management software system described in more detail below.

Figure 3:
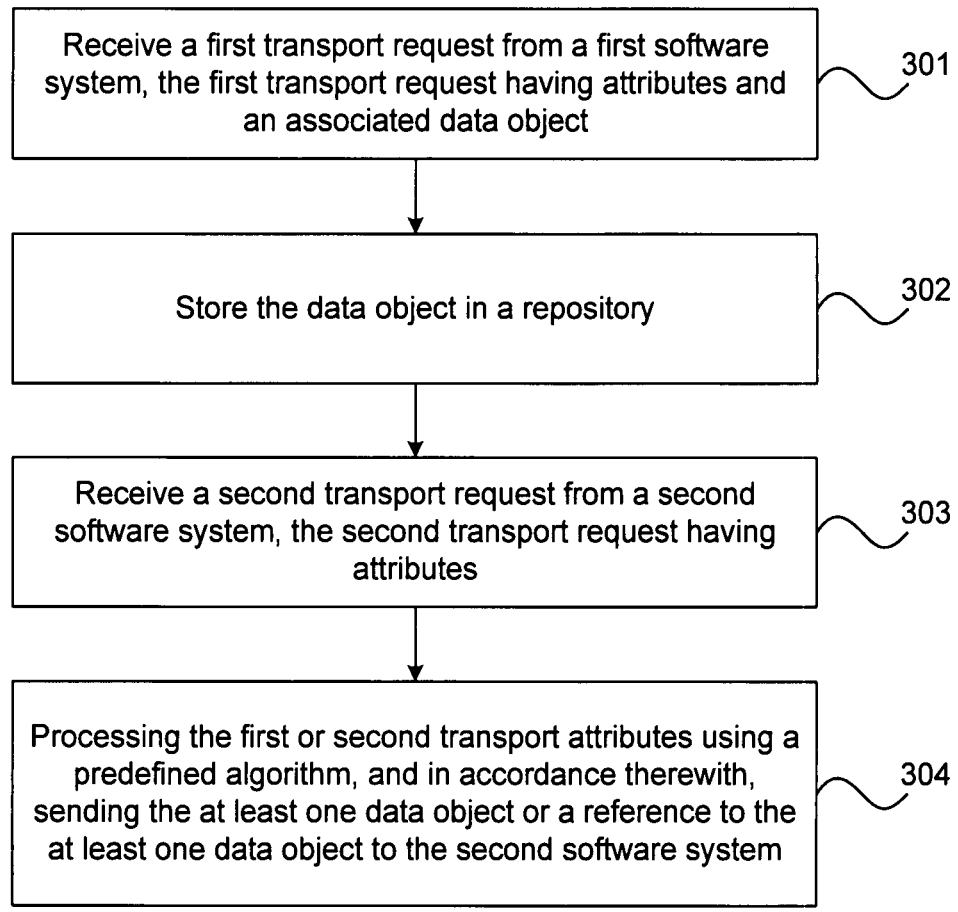
FIG. 3 illustrates a method of exchanging information according to one embodiment of the present invention.

FIG. 3 illustrates a method of exchanging information using an object warehouse according to one embodiment of the present invention. At 301, a first transport request is received from a first software system. The transport request may comprise first attributes, wherein the first transport attributes are associated with at least one data object. At 302, the data object is stored in a repository. At 303, a second transport request is received from a second software system. The second transport request may comprise second attributes. At 303, the first and second transport request attributes may be processed using a predefined algorithm, and in accordance therewith, the data object or a reference to the data object is sent to the second software system. For example, the algorithm may be a rule, which specifies a distribution or security policy. The rule may be stored in the repository and accessed by a rule engine for allowing retrieval access to software systems having particular attributes.

EXAMPLE 1

Persistent Web Architecture

Figure 4:
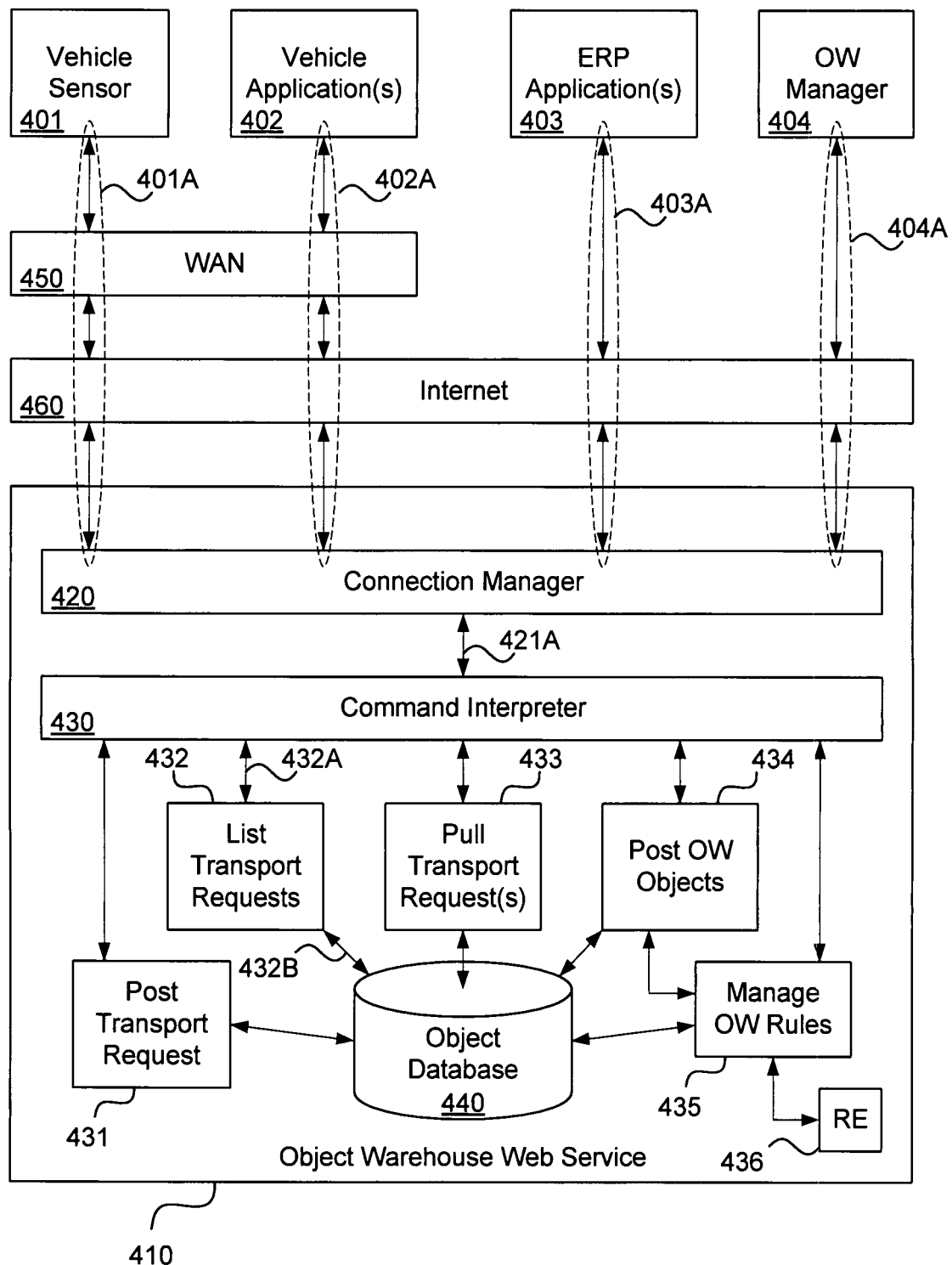
FIG. 4 is an example of an object warehouse implemented as a web service according to one embodiment of the present invention.

FIG. 4 is an example of an object warehouse ("OW") implemented as a software service available on the Internet (i.e., a "Web Service"). In this example, software systems such as vehicle sensor 401, applications 402-403, or an OW manager 404 may invoke the services 431-435 of object warehouse 410 through a web service interface. Each application may establish a connection with a connection manager 420 included with OW 410. Connections to OW 410 may be established serially (one at a time) or in parallel (multiple connections at overlapping times), for example. In this example, information may be exchanged between vehicle sensors 401 and OW 410 over connection 401A. Similarly, information may be exchanged between vehicle software applications 402 and OW 410 over another connection 402A. Both vehicle systems 401 and 402 may establish connections to the Internet 460 using a wide area network 450 such as WiFi, CDMA, GSM, or WiMax. OW 410 may also be coupled to one or more enterprise resource planning ("ERP") applications 403 over connection 403A, which may be a standard internet connection. OW 410 may also be coupled to an object warehouse manager 404 over connection 404A for performing a variety of administrative functions on the object warehouse.

In the case of vehicles or other mobile devices, such connections may be intermittent due to either limited wireless connectivity or turning off the application or its hosting platform (i.e., turning off a cell phone or the vehicle). Features and advantages of some embodiments of the present invention include the ability to exchange information between software systems when one of the software systems may be unavailable. For example, because the object warehouse is persistent, information may be sent in advance of the recipient being powered on, activated, or otherwise instantiated. For instance, an application or software service may send a data object to the OW for use by another part of the same application or service (e.g., at different points in an algorithm or for data generated and used by different internal components). Alternatively, applications or services may generate data objects and store the data objects in the OW so that other applications or software services may retrieve the data objects at a later time (e.g., when the application or service is available for processing more data). As another example, software updates or messages may be sent to the user of a mobile system (e.g., a phone or vehicle) and when the phone or vehicle is turned on the mobile system establishes a connection to the OW and the information is automatically retrieved. In one embodiment, the OW is located at a persistent address on the Internet 460 to make the OW accessible to a wide range of WAN connections. As described above, attributes of the source and/or target software systems may be used to ensure proper delivery of the data objects according to a wide variety of predefined distribution or security algorithms. As described in more detail below, algorithms may be executed based on the type of connection, and may involve forms of authentication specific to the connection type (e.g., SSL certificate exchange for an "http" connection).

In this example, a connection to OW 410 is first established, and then each software system sends a request for the list of objects stored in the OW that are directed to each particular software system. The transport request is passed via internal connection 421A to the OW's command interpreter 430. For example, if the request is determined to include a list instruction, then it may be handed to the "List Transport Requests" process 432 (i.e., list objects held for me). This may take place using a private socket 432A, for example. The process 432 may form a query 432B to an object database 440 to search for objects being held for a particular software system, and execute the query 432B against the database 440 storing the objects. In one embodiment, the result may be priority structured into a reply to the requesting software system using the established connection. A list of data objects may be sent back to a software system so that a user may select one or more of the data objects for retrieval, for example.

The requesting software system may receive the list and determine which if any of the objects it wishes to retrieve. The software system may then send an instruction to the OW that is interpreted to activate the "Pull Transport Request(s)" process 433 (i.e., "Pickup Object Held for Me"). This request may be delivered via the open connection to the OW's command interpreter 430. It is then forwarded via a private socket 433A to the "Pull Transport Request(s)" process 433. The process forms a query to fetch the object and returns it to the software server. In one embodiment, the open connection may be used for this transaction. Additionally, OW 410 may include instructions for pulling one object at a time or pulling multiple objects in one transaction.

Any one of software systems 401-404 may issue a transport request including a data object to be stored in OW 410. For example, ERP application 403 may issue an object transport request ("OTR") via the connection 403A requesting to "Dropoff Objects for Pickup." This OTR arrives at the command interpreter 430 and is sent to the post transport request process 431 (i.e., "Dropff Objects for Pickup"). This process may then forms a query to add the OTR into the database of objects being stored for pickup by other software systems.

As mentioned above, OW 410 may also be coupled to an object warehouse manager 404 for performing a variety of administrative functions on the OW. For example, activity of OW 410 may be logged, and the log may be accessed by the OW Manager Application 404. Additionally, internal working attributes of OW 410 may be adjusted by the OW Manager Application. The OW Manager Application may deliver commands to the OW in the form of object transport requests ("OTR"), wherein the data object being delivered is a new OW command. The new command may be stored in the OW using post OW object process 434 (i.e., "objects for storage in the OW"). OW 410 may generate a response to the OW Manager Application delivering an OTR to the Manager Application 404 through the command interpreter 430. The OTR response generated by the OW is sent to post transport request process 431. Accordingly, the next time OW Manager Application 404 requests a list of objects being held it will see the response object waiting for pickup. The example implementation shown and described above with reference to FIG. 4 is only one example implementation.

As mentioned above, the OW supports the ability to send signals to (i.e., Callback) software systems, for example, when an event occurs. For instance, OW 410 may include a rule engine 436 ("RE") that may be provide with new rules using the same dropoff/pickup mechanism that has been described for the OW Manager 404. In this case OTRs are dropped off by any application or system to be picked up by the OW. The object in these OTRs may include a rule definition or attributes for allowing the OW to successfully signal (Callback) an application or software system. The rules may be managed inside the OW by the "Manage OW Rules" process 435. The rules themselves may be stored database 440 and accessed via queries.

EXAMPLE 2

Sender/Recipient Attribute Matching

Figure 5:
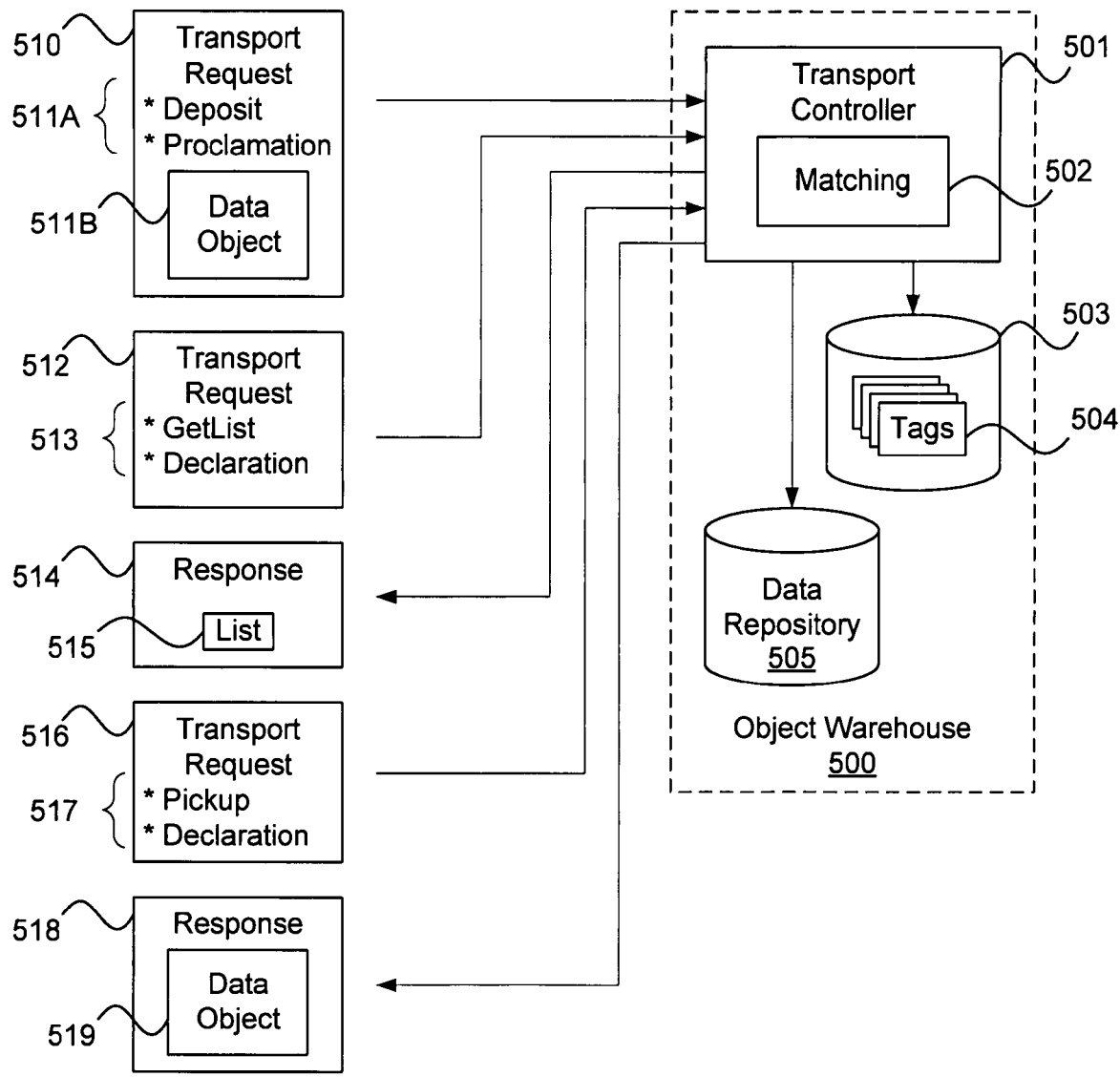
FIG. 5 illustrates a system for exchanging information according to another embodiment of the present invention.

FIG. 5 illustrates a system for exchanging information according to another embodiment of the present invention. In this example, the transport controller receives transport requests comprising data objects, stores the data objects, and sends the data object to recipients based on attributes of the transport requests. For example, object warehouse ("OW") 500 may include a transport controller 501 that receives a first transport request 510. Transport request 510 may include attribute information 511A and an associated data object 511B. In this example, the attribute information may include an instruction to "deposit" the data object in OW 500 and a "proclamation." The proclamation is an attribute that defines criteria for retrieving (i.e., picking up) the data object. In this example, the proclamation may describe the intended recipient of the data object.

When transport request 510 is received by transport controller 501, transport controller may generate a tag (or record) including the attributes from the received transport request. Accordingly, as data objects are received by OW 500, a plurality of tags 504 may be generated. These tags may be stored in the system in a variety of forms or formats and associated with the data objects they are received with. For example, in one embodiment the generated tags 504 may be stored in a database 503 and each tag is associated with a data object (e.g., in the same database or in another database). As another example, the tags may be objects associated with the data objects. At some point in time, the system may receive a transport request 512 from the target recipient or recipients described in the attributes of transport request 510. Transport request 512 may also include attribute information 513. Here, the attribute information 513 includes a "GetList" instruction and a "declaration." The declaration may provide identifying information about the initiator of request 512. For instance, attribute information may describe the sender of transport request 512. In response to receiving the second transport request 512, the system may generate another tag comprising the attribute information from transport request 512. In this example, OW 500 includes a matching software component 502 that compares attribute information from request 512 with the attribute information from transport requests that deposited data objects in the OW. The matching component may be part of the transport controller 501 or a separate component. If attribute information 513 in a transport request 512, for example, matches attribute information 511A in a tag 504, then a response 514 may be sent to the sender of transport request 514 indicating that there is a data object available for retrieval. For example, attributes describing a data object may be added to a list 516. Accordingly, list 516 may identify all data objects having associated tags that matched the attribute information of transport request 512. The list may be sent in response 514. An application, user, vehicle, or another OW, for example, may generate another transport request 516 to retrieve one or more of the data objects identified on the list. Transport request 516 may include attribute information 517 including a "pickup" instruction and information describing the sender of transport request 516 in the "declaration." In response to receiving the "pickup" instruction in the transport request, the system may generate another tag based on the attribute information in transport request 516. Matching component 502 may then compare the attribute information to the attribute information in each tag 504 and send the data objects 519 associated with each matching tag back to the sender of request 516 in response 518. It is to be understood that the step of retrieving a list prior to retrieving the data objects may be optional in some applications. Similarly, in other applications, it may only be desirable to retrieve the list of eligible data objects, but not the objects themselves.

In another embodiment, each tag 504 may include a tag ID, and list 515 may return the tag IDs of tags that match the attribute information in transport request 512. In this embodiment, transport request 516 may include a "pickup" instruction and one or more attributes for storing the tag IDs to be retrieved. In response to receiving transport request 516, OW 500 may access each tag having a tag ID specified in the transport request and return the data object associated with each tag in response 518.

Figure 6:
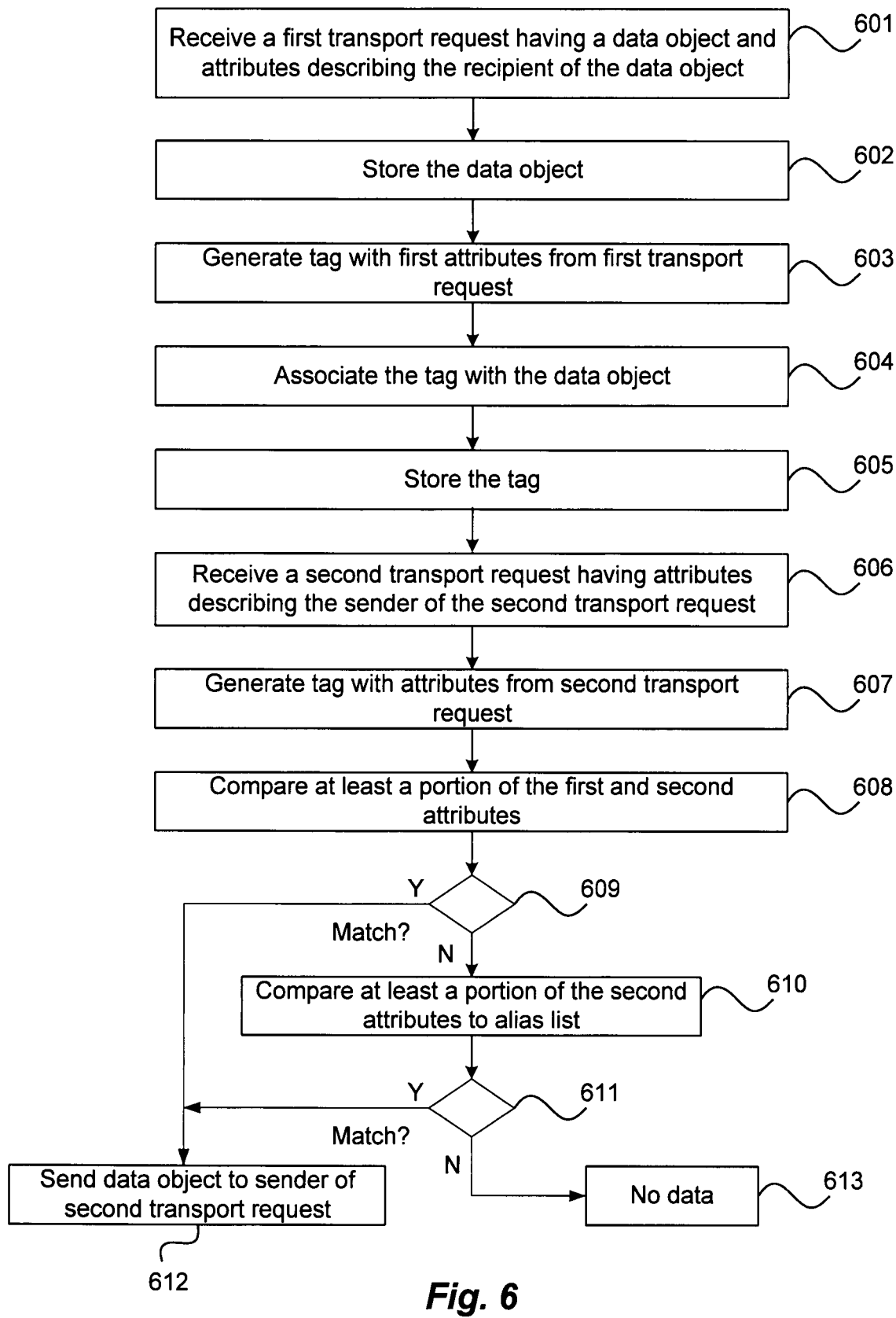
FIG. 6 illustrates a method of exchanging information according to another embodiment of the present invention.

FIG. 6 illustrates a method of exchanging information according to another embodiment of the present invention. At 601, a first transport request is received having a data object and attribute information including attribute information describing the recipient(s) of the data object and possibly other attribute information (e.g., describing the data object). At 602 the data object is stored. At 603, a tag is generated. The tag has the attribute information from the transport request that describes the recipient(s) of the data object and possibly other information. At 604, the tag is associated with the data object. For example, the tag and the data object may be stored together or the tag and the data object may be stored separately and associated using a variety of software programming techniques (e.g., a pointer, an index, or an ID). At 605, the tag is stored for later access. At 606, another transport request is received (i.e., a "second" transport request). The second transport request may be from an entity desiring to retrieve data objects that designate them as the recipient. Any number of additional transport requests with data objects may be received before an intended recipient initiates a retrieval. Accordingly, an intended recipient may retrieve multiple data objects sent to them from multiple different sources and across multiple different communication medium. At 607, another tag is generated with attributes from the second transport request. At 608, attributes from the first and second transport requests are compared. For example, attributes in the tag generated from the second transport request may be compared against numerous tags generated in response to receiving transport requests that deposited data objects. The comparison may be performed by a matching component as described above. If there is a match, then one or more data objects or a list of objects may be sent back to the sender of the second transport request. In another embodiment, access information to an object, such as a link for example, may be sent back, and a system uses the access information to obtain the object.

In some embodiments, one or more tags may each be associated with an alias list. For example, a tag may include attribute information describing an intended recipient or recipients. However, some intended recipients may be described in different ways. For instance, one way to describe an intended recipient is by name. But a single recipient may use different names in different contexts. For example, a person may be identified by multiple email addresses such as joe.smith@domain1.com, jsmith@domain2.com, or js@domain3.com, which may all be valid email addresses for the same person. Accordingly, an alias list may include additional attributes with multiple alternate descriptions of a recipient or recipients. Another example may be "CA BMW OWNERS", "CALIFORNIA BMW OWNERS", "CA BMW", etc., for describing a class of recipients—i.e., owners of BMWs in the State of California. It is to be understood that any descriptions of recipients may be used in different embodiments of the present invention, and that any appropriate alternate descriptions of such recipients may be included in an alias list and associated with a tag. Accordingly, if no match is found at 609, the second attribute information is compared against alias lists associated with each tag, if any. If a match is found with the attributes in an alias list, then the associated data object is sent or otherwise accessed at 612. If no matches are found, no data may be sent back. For example, a message may be sent indicating that there are no data objects available for retrieval.

Embodiments of the present invention include a method of exchanging information using a unique identification for participants that can be used in the operation of a digital object warehouse ("OW"). As described above, participants include software applications, vehicles, mobile devices, other OWs, for example. In one embodiment, the participants are vehicles and the OW is referred to as a vehicle object warehouse ("VOW"). In other embodiments, the participants are other types of mobile systems (e.g., portable phones, portable computers, personal digital assistants ("PDA"), or portable entertainment systems such as an handheld music system, portable video system, or portable gaming system).

In one embodiment of an OW, a participant deposits a data object along with a "proclamation" that in part names which participant(s) are allowed to retrieve the object. Subsequently, a participant connects to the OW with a "declaration" which includes the pickup participant's "name." The participants may be mobile and can be acting in varying roles. In some applications, this results in multiple distinguished "name forms" being used to describe a single participant. Furthermore, heterogeneous communication mediums make traditional name/address bindings complex if not useless. Some embodiments of the present invention provide a unique way to respond to these complex naming conditions and allow for ongoing "name form" variations as well as the introduction of totally new name forms.

In one example embodiment, the OW provides a "Lookup" function that matches attribute information in "declarations" with "proclamations" and determines the data objects that are available to be picked up. In one implementation, the OW may use a Lookup function based on a single SQL-Query. This implementation may be useful where the declarations and proclamations contain common and simple name forms. In other implementations, the Lookup function is required to deal with several different "name forms" and the many different "names" (e.g., aliases as described above) a single participant might have. Accordingly, an expanded methodology using an alias list is used for supporting multiple name forms and extensibility of the Lookup function.

Embodiments of the OW may be applicable to a wide variety of applications and technology environments. Consequently, the issue of how to deal with a wide range of "name spaces" and multiple "name" bindings for OW participants is address as a specific example. As mentioned above, participant names used in declarations and proclamations may have different name forms and span different naming domains. However, such names and/or name forms may be referring to the same participant(s). For example, names are typically presented in a syntax that has form and definition. The form may be provided by a standards body or by a communication compliance body (e.g., WWW Consortia, IETF, NANDC, EPC Global, DOI). The definition of any given form is usually assigned by some registration process or domain registry. Different systems are typically either segregated from each other or federated through some naming exchange facility. However, even if all objects in the world of digital objects agreed to use a common name form such as DOI or URI the common practice of distributed name definition among domain authorities would still cause some problems. In the example describe above, a user may have different names in different domains such as joe.smith@domain1.com, jsmith@domain2.com, or js@domain3.com.

Referring again to FIG. 5, in one example embodiment an OW 500 may be implemented as a set of web services designed to processes transport requests from a participant (e.g., a vehicle, an application, or another web service). Transport requests may include instructions which select what services the OW should carry out (e.g., deposit 510, GetList 512, and pickup 516). Data objects may be delivered to the OW by participants with a "deposit" instruction along with a "proclamation" that provides the criteria for picking up the object. The proclamation is processed by the web service(s) (e.g., the transport handler implemented as a web service) and a tag is formed and stored in the tag database 503. At some later time another participant or the same participant delivers a GetList instruction in transport request 512 to the OW along with a declaration that provides identifying attributes of the participant. The web service processes the declaration to produce another tag. The web service uses a matching component to execute a Lookup function for all the tags in the tag DB 503 that match the participant tag. The OW then sends the list 515 of the objects in the object repository 505 that match. The list may be prioritized, for example.

Figure 7:
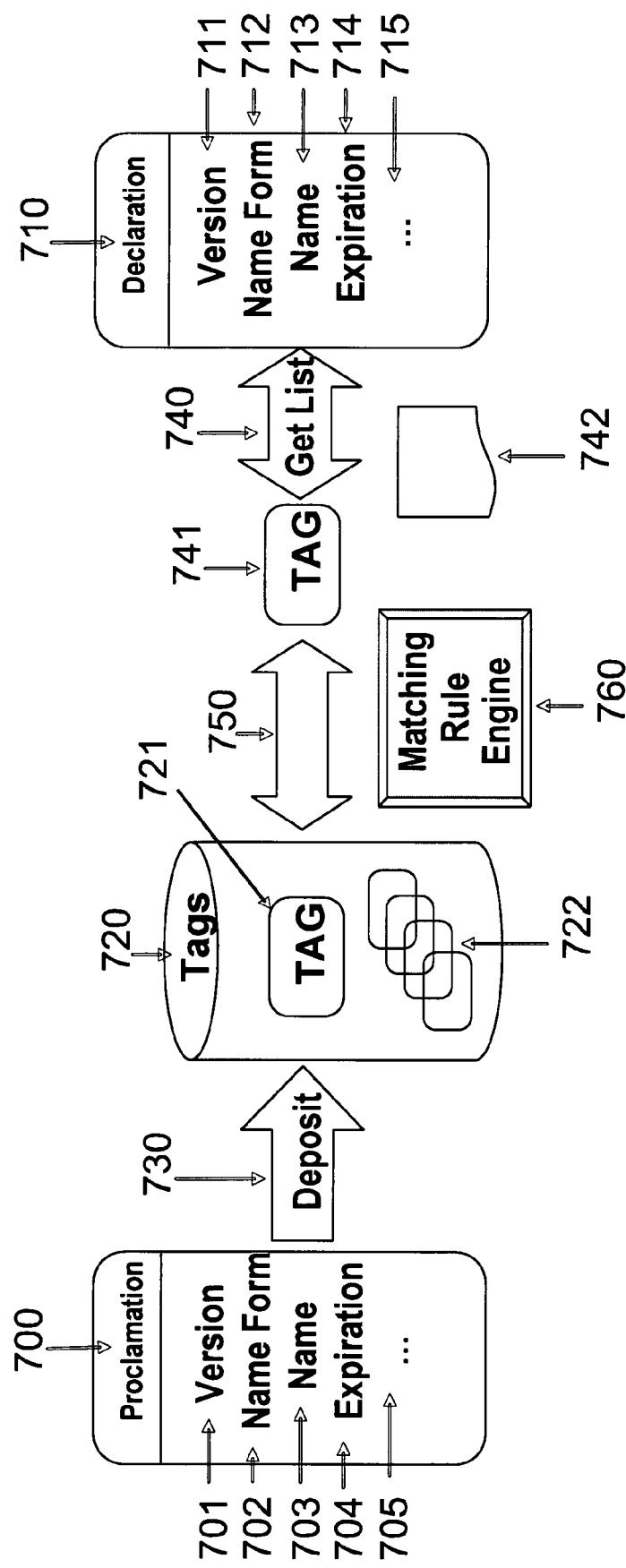
FIG. 7 illustrates an example method of exchanging information according to another embodiment of the present invention.

FIG. 7 illustrates an example method of exchanging information according to another embodiment of the present invention. In this example, the proclamation 700 and declaration 710 provided by participants may be a multi-attribute xml data construct. The attribute information in this example includes "name form" and "name" attributes. The attribute information may further include version 701 and 711 attributes simply indicate the vintage of the application supplying the data structure, an expiration 704 and 714 and a variety of other attributes 705 and 715. The OW processes the deposit instruction 730 by parsing the proclamation 700 attributes 701-705 to produce the tag 721 and stores the tag 721 in a tag DB 720. Similarly, the OW processes the GetList instruction 740 by parsing the declaration 710 attributes 711-715 to produce another tag 741. In this example, the matching component is implemented as a matching rule engine 760. The matching rule engine 760 can be modified with different rules to maintain flexibility and extensibility of matching criteria. The OW performs a Lookup function using a matching rule engine 760. All matches 750 found by the Lookup function may be returned via a list 742 to the pickup participant.

FIG. 8 illustrates example attribute information according to another embodiment of the present invention. In one embodiment, the format of the attribute information in the transport requests may be transformed into another format in the tag. For example, the OW may transform the participant name from its presented name form into another form in the tag. In one embodiment, attribute information such as name and name form may be encoded into a tag identity, for example. Additionally, the attribute information may be used to specify a "class" or "group" as described in more detail below. The format used in the tag may be designed to speed the Lookup function (e.g., in the matching rule engine). If an alias exists for a name then the alias index may be included in the tag. If alias matching is allowed (which may be the default) then the matching rule engine will also consider the alias index while finding matches for a Lookup. As illustrated in FIG. 8, proclamations and declarations may include, among other information, participant identifications 800 in the form of name form 811 and name 812, which describe the participant. As illustrated in 820, there are several samples of participant IDs 801, 802, 803, and 804. The name forms include internet protocol (IP) address, digital object identifier ("DOI"), universal resource locator ("URL"), and a telephone number in the format of the North American Numbering Plan ("NANP"). These are just a few examples of different name forms that may be used in a participant ID. Another would be a vehicle identification number, for example. Table 840 is an example of the resulting tags 850 for each of the example participant IDs received in a transport request. The example tags 851, 852, 853, and 854 each comprise an identity index 821, a class ID 822, an alias index 823, and a resident OW ID 824. The identity index may be an internal representation of the name and name form combined into an internal code useful for speeding up access of the tags. Additionally, example classes may be cars, documents, music, or phones to name just a few. Alias index 823 may specify an alias list to be used for the tag during matching. Finally, OW ID 824 may indicate that a particular OW is the resident OW for the participant.

Figure 9:
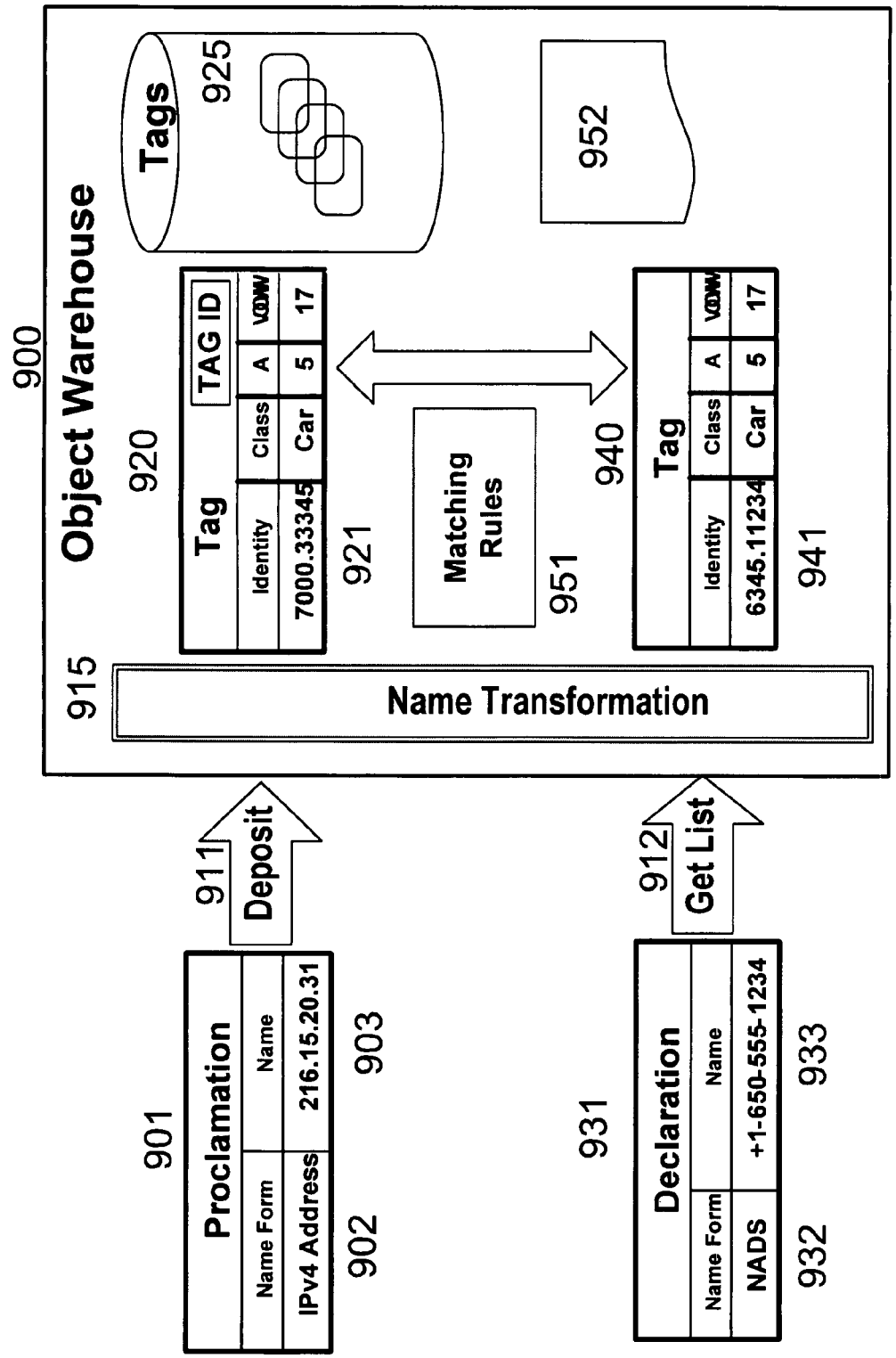
FIG. 9 illustrates an example of information exchange according to another embodiment of the present invention.

FIG. 9 illustrates an example of information exchange according to another embodiment of the present invention. This example tracks the operation sequence of a proclamation 901 being delivered to an OW 900 via a deposit 911 request. In this example, the name form 902 and name 903 go through a transformation process 915 to generate a tag 920. The tag is then stored in the tags DB 925. Later, declaration 931 is delivered to the OW via a GetList transport request 912. The declaration name form 932 and name 933 are processed through the transformation process 915 and a tag 940 is produced. The matching rule engine 951 may compare the attribute information from request 912 against entries in the tag DB to find a match. The illustration shows a match with tag 920 using an associated alias list. The tag ID for tag 920 is then put into a message list 952 to be returned to the GetList requester after all matching tags have been found in the tag DB 925.

Figure 10:
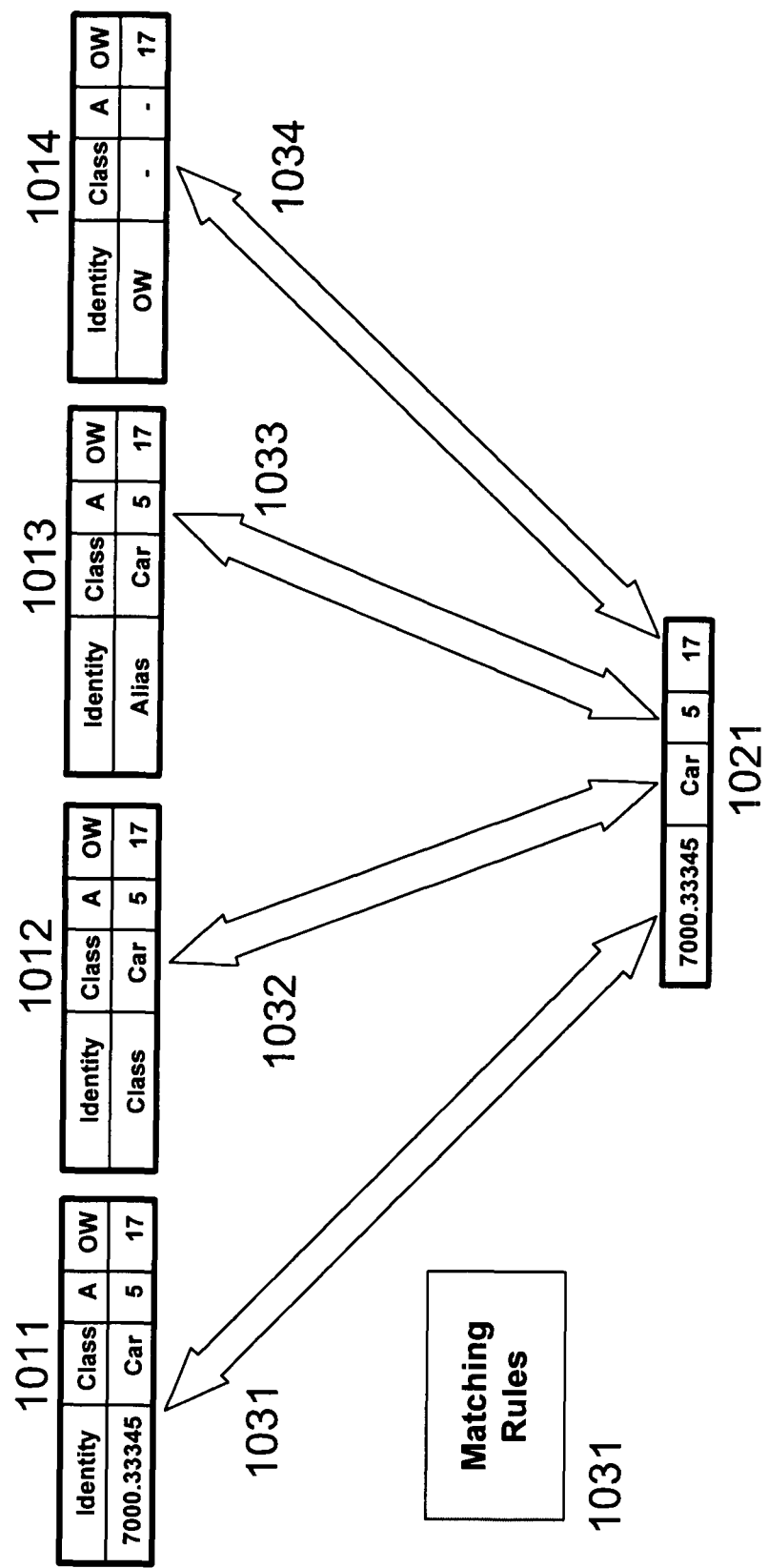
FIG. 10 illustrates different examples of matching techniques according to another embodiment of the present invention.

FIG. 10 illustrates different examples of matching techniques according to another embodiment of the present invention. This example illustrates four (4) different examples of matches. Tags 1011, 1012, 1013, and 1014 are all from past proclamations and are located in the tag DB. The lower part of FIG. 10 shows a tag 1021 which has come from an incoming declaration. The matching rule engine 1031 processes a Lookup procedure for tag 1021 and finds the following matches: (i) match 1031 with tag 1011 is an exact identity match up because the encoded name form and name in the proclamation and declaration are identical, (ii) match 1032 with tag 1012 is a class match up (even though the identities do not match, the tags have the same class, which may be sufficient according to some matching algorithms (e.g., some rules in the matching rule engine)), (iii) match 1033 with tag 1013 is an alias match (even though the identities do not match, the alias list associated with tag 1013 includes attribute information that matches), (iv) match 1034 is an OW match (even though the identities, classes, and aliases do not match, the matching algorithm or rule may accepts a match for any declaration coming into the same OW that the proclamation was delivered to, for example).

EXAMPLE 3

Participant Grouping

Object warehouses according to some embodiments of the present invention support sending data objects to groups or classes of recipients. Groups are an enumerated set of recipients that may be referenced in a transport request by a group name. When a group name is supplied in a proclamation, for example, any member of the group will be entitled to pickup the object from the OW. Classes are a non-enumerated set of recipients that may be referenced in a transport request by class name, where any member of the class is entitled to pick-up the object from the OW. Exchanging information using classes may be performed using the attribute matching techniques described above. In some embodiments, the set of participants that make up a group or class may be managed by a registration process outside the OW, and the membership may be communicated to the OW (e.g., dynamically as set forth below).

Figure 11:
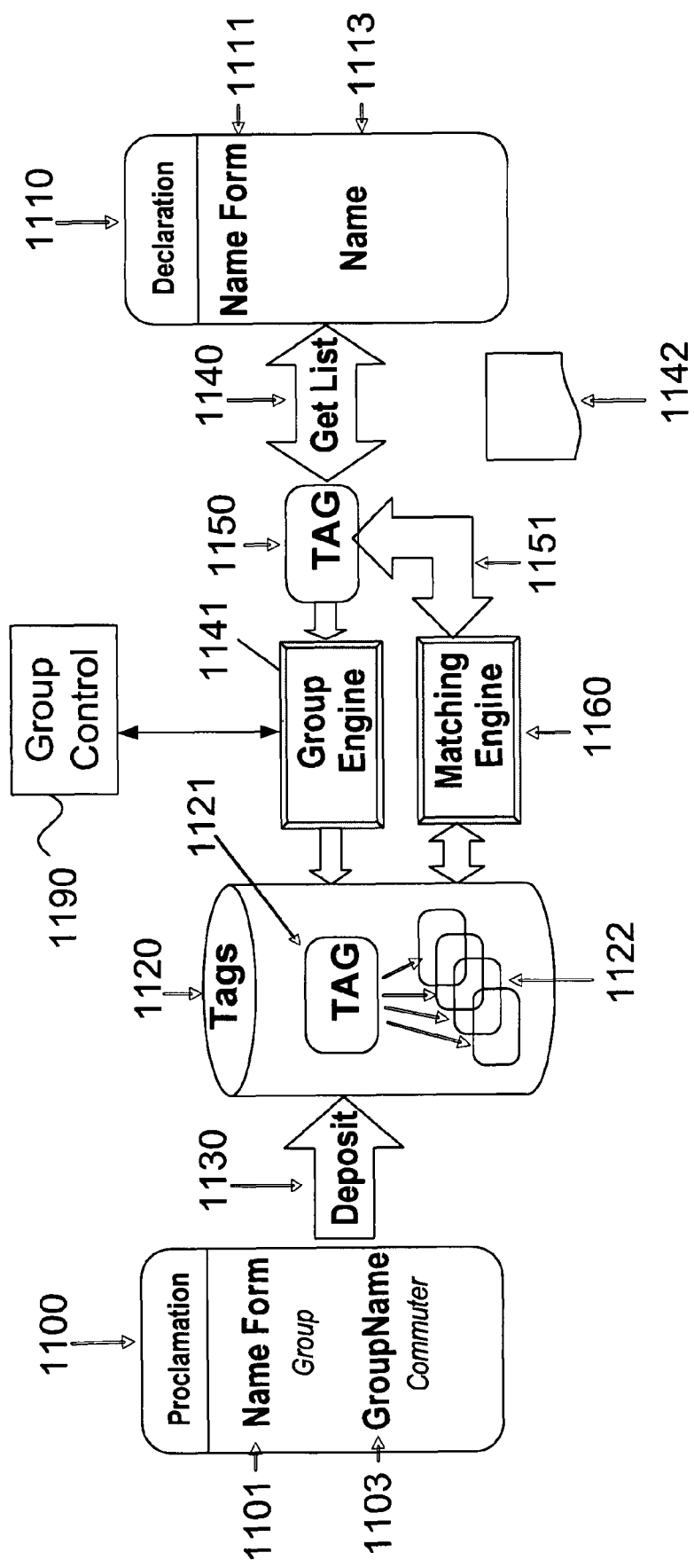
FIG. 11 illustrates an example of exchanging information based on groups according to another embodiment of the present invention.

FIG. 11 illustrates an example of exchanging information based on groups according to another embodiment of the present invention. The example in FIG. 11 illustrates a method of creating, maintaining, and deleting groups that can be used in the operation of an OW. As described above, the embodiments of the OW allow a participant to deposit an object along with a proclamation that in part names which participant(s) are allowed to retrieve the object. Subsequently, a participant connects to the OW with a declaration that includes the pickup participant's name. However, in this example, proclamation 1100 includes a name form 1101 of "group" and group name 1103 (e.g., commuter). Accordingly, any member of the group (e.g., commuters) will be entitled to pick-up the object. Groups allow a number of participants to be organized under a common group name. As described in more detail below, grouping can be static or dynamic.

Referring to FIG. 11, a data object is delivered to the OW by a depositing participant with a deposit instruction 1130 along with a proclamation 1100 that may provides the criteria for picking up the object. The proclamation 1100 may be processed by the web service and a tag 1121 may be generated and stored in the tag database 1120. The attribute information in the proclamation may include a name form 1101 that may describe the recipient of the data object as a group (e.g., a static group—"Std-Group") and a name (or group name) describing the target group. The OW may receive an attribute indicating that the name form is a group, and access the group information for the named group. The group information for the named group may include information describing each participant of the group. The group name is processed by the OW and a tag is produced for each participant member of the group. Accessing the group information and generating the tags in response to receiving a group attribute may be performed by a group rule engine 1141, for example. The generated tags 1122 for each participant are stored in the tag database 1120. Some time later, another participant delivers a Get List instruction 1140 to the OW along with a declaration 1110 that provides attribute information describing the pickup participant. The OW processes the declaration 1110 to produce a tag 1150. Then, the OW uses the matching rule engine 1160 to compare all the tags in the tag database 1120 with tag 1150. The OW then sends a list 1142 of eligible objects associated with matching tags 1122 to the pickup participant.

As mentioned above, in another embodiment the groups are dynamic. For example, referring again to FIG. 11, a data object may be delivered to the OW by a depositing participant with a deposit instruction 1130 along with a proclamation 1100 having a name form 1102 specifying a dynamic group (e.g., "Dyn-Group") and a name (or group name) specifying the target dynamic group. The OW may receive the attribute specifying that the name form is a dynamic group, for example and generate and store a tag 1121 in the tag database 1120. The group name may be preserved in the tag stored in the tag database. Some time later another participant delivers a Get List instruction 1140 to the OW along with a declaration 1110 that provides identifying attributes of the pickup participant. The OW processes the declaration 1110 to produce a tag 1150. Then the OW uses the group engine 1141 to execute a function for all the dynamic group tags in the tag database 1120 to determine if the pickup participant is now a member of one of the dynamic groups. For example, the group engine may access a group control component 1190 that dynamically tracks group membership. An example of dynamic grouping involves subscriptions. In a subscription, one group of participants signup for a service, which may create groups from the subscribers based upon rules or event(s). The service may include group control component 1190 for modifying participants of the groups. In one embodiment, the group control component 1190 is part of the OW. In other embodiments, the group control component is external to the OW. For example, in some embodiments the group control component is part of a web service that is accessed by the OW to determine which participants are in each group specified in the tags having dynamic grouping in tag database 1120. Once the participants of a group are determined, the OW may send a list 1142, which may be prioritized, of eligible objects for the pickup participant if the participant is in one of the groups.

With this dynamic grouping capability, information can be multicast to sets of recipients which are rapidly formed based upon conditions set forth by the depositor of information. As eligibility becomes dynamic it will be necessary to double check an object's eligibility for pickup. Eligibility may first be checked in the construction of the list of eligible objects for a participant. Eligibility may then be checked again when the participant returns to pickup the object, for example, because in some applications the participant's eligibility may have changed in this period of time between getting the list and picking up the object.

EXAMPLE 4

Location Based Processing

Figure 12:
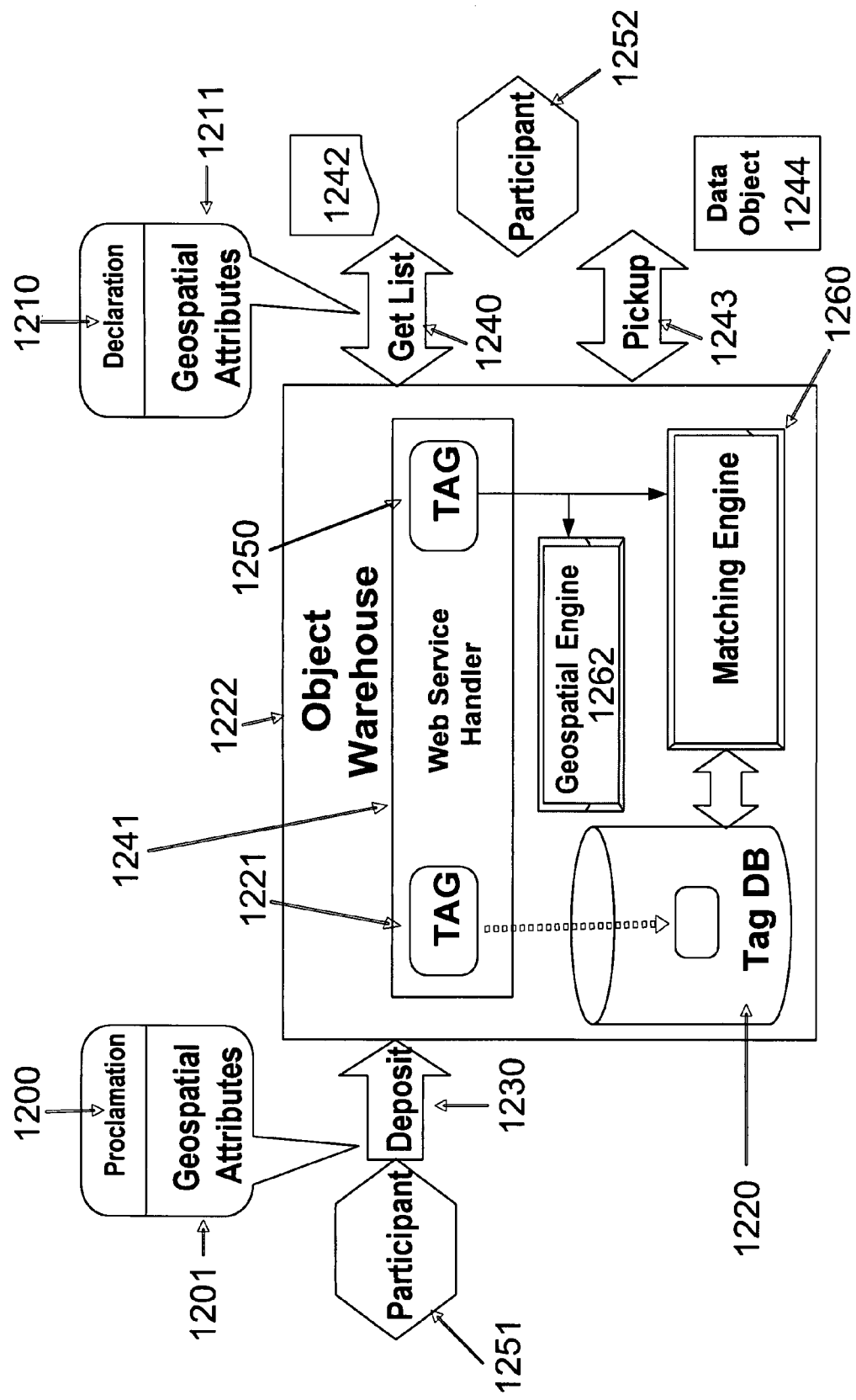
FIG. 12 illustrates an example of exchanging information based on geospatial information according to another embodiment of the present invention.

FIG. 12 illustrates an example of exchanging information based on geospatial information according to another embodiment of the present invention. In this example, attribute information in the transport requests may include geospatial attributes, which may also be referred to as geometric or location attributes or information. The geospatial attributes may include, for example, longitude and latitudes, altitudes, GPS coordinates, or any other information relating to the geospatial location of a participant sending or receiving data objects to or from the OW. For example, a data object may be delivered to OW 1222 by a depositing participant 1251 with a deposit instruction 1230 along with a proclamation 1200 that include geospatial attributes 1201. The geospatial attributes may provide geospatial criteria for picking up the object. For example, geospatial attributes may define a region so that anyone within the specified region may be a recipient of the data object (e.g., the data object may be a weather report for the region). The geospatial attributes may define an altitude so that any recipient above such altitude may received the data object (e.g., if the data object is an Icy Road Warning). Geospatial attribute information may be used alone or together with a variety of other attributes to describe the recipient(s) of data objects stored in the OW. Proclamation 1200 may be processed by a web service handler 1241 in the OW and a tag 1221 is generated and stored in the tag DB 1220. Since the proclamation contains geospatial information 1201, such information may be processed by a geospatial software component 1262 (e.g., a geospatial engine) and the results are stored along with the tag 1221 in the tag DB 1220.

At a later point in time, a pickup participant 1252 may deliver a Get List instruction 1240 to the OW 1222 along with a declaration 1210 that includes geospatial attributes 1211 of the pickup participant. The web service handler 1241 processes the declaration 1210 to produce a tag 1250. Since the declaration contains geospatial information, such information may be processed by the GeoMat Engine 1262 and the results are sent to the matching rule engine 1260 along with the pickup participant tag 1250. Then, the OW uses its matching rule engine 1260 to execute a Lookup for all the tags in the tag DB 1222 that match the pickup participant's tag 1250. For example, a GeoMat engine may receive the attribute information and generate an encoded geospatial value representing the combined geospatial information for each participant. In other words, GPS information or latitudes and longitudes may be combined into a single encoded value. The encoded geospatial value of participant 1252 may be compared against a range of values specified by geospatial attributes 1201 to determine if the geospatial information for participant 1252 meets the criteria specified by geospatial information 1201. The GeoMat Engine results may be used to determine if the geospatial attributes of the pickup participant 1253 match the requirements of tag 1221 in the tag DB 1220. Matching may include determining if the encoded geospatial value falls within a range specified in similarly encoded geospatial attributes defining the criteria for accessing the data object. Matching may alternatively include determining if the geospatial information is greater than or less than other criteria (e.g., corresponding to latitudes, longitudes, altitudes, GPS coordinates, or other geospatial criteria). If the criteria are satisfied, the OW then sends back a list 1242 of data objects eligible for this participant to pickup.

Participant 1252 may then deliver a pickup instruction 1242 to the OW 1222 along with a declaration containing geospatial attributes and an identification of the object to be picked up (e.g., taken from a previous Get List reply). The OW's web service handler 1241 processes this request and produces another tag 1250. Tag 1250 and the identification of the data object is then sent to the matching component 1260. The geometric attributes may be sent to the GeoMat Engine 1262. The GeoMat Engine 1262' and matching component 1260 may verify that object is still eligible for pickup by this participant. If the geospatial attributes of the participant have changed such that the participant is no longer eligible (e.g., if a driver of a car has driven outside a region defined by geometric attributes 1201), then the participant will not be able to pick up the object. However, if the geometric attributes are verified again and if the participant is still eligible, a data object 1244 is sent back to the requesting pickup participant 1252.

EXAMPLE 5

Tokens

Figure 13:
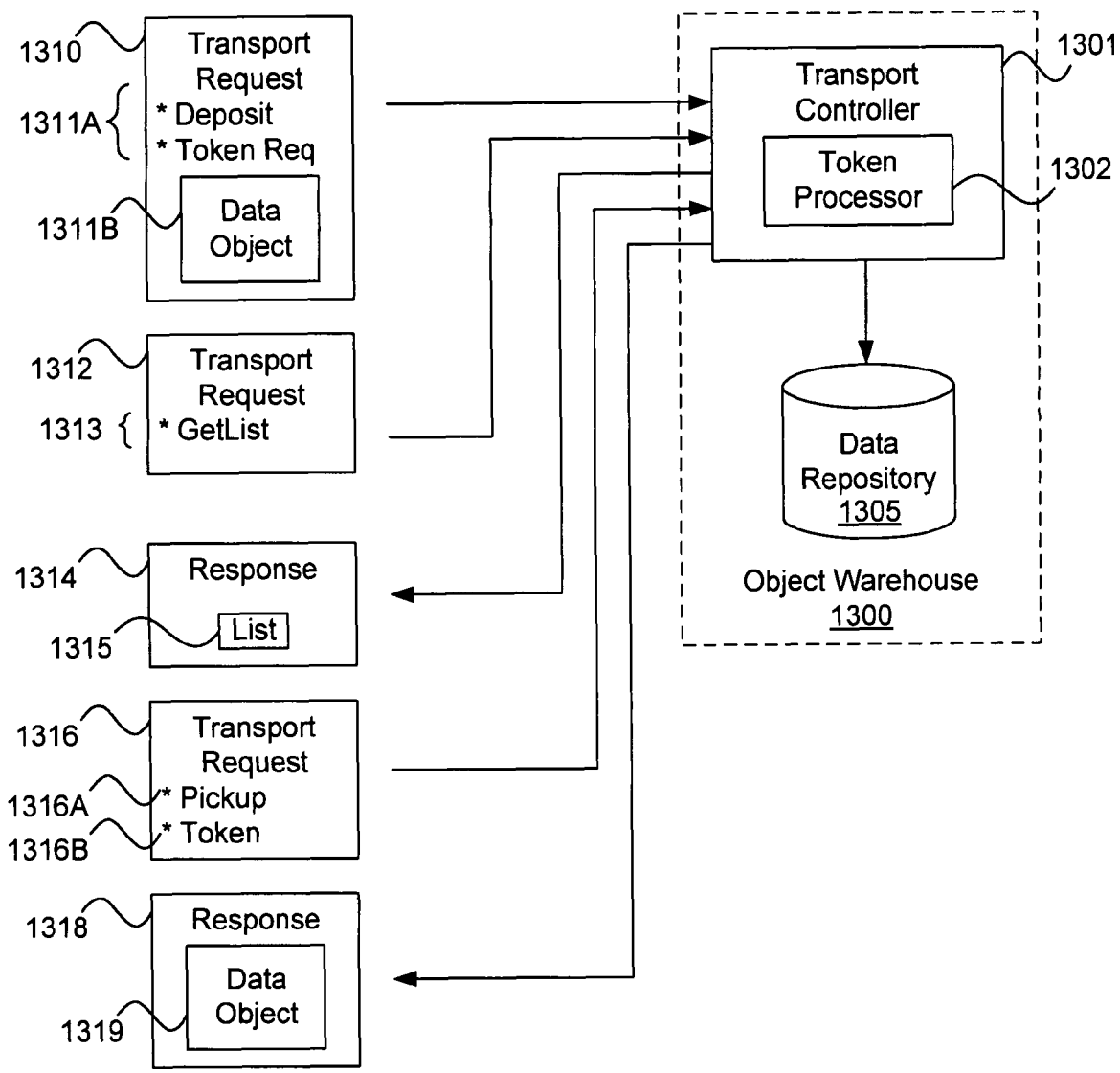
FIG. 13 illustrates an example of exchanging information using tokens according to another embodiment of the present invention.

FIG. 13 illustrates an example of exchanging information using tokens according to another embodiment of the present invention. In this example, an object warehouse 1300 includes a transport controller 1301 that receives a transport request 1310 comprising a data object 1311B and attribute information 1311A indicating that a token is required to retrieve the data object. Accordingly, if OW 1300 receives a transport request including the appropriate token, the OW may send the data object back to the system providing the token. In this example, data object 1311B is stored in the repository 1305. At a later point in time, a transport request 1312 is received, which includes a GetList instruction 1313. In response to the GetList instruction, OW 1300 may generate a response 1314 including a list 1315 specifying data objects available for retrieval. If one or more of the data objects were deposited with attributes indicating a token is required to retrieve the data objects, then list 1315 may specify that a token is required to retrieve such data objects. Next, a transport request 1316 may be received, which includes a pickup instruction 1316A and a token 1316B. Upon receiving the token, OW 1300 may attempt to validate the token. Validation may include determining if the received token qualifies as the token required to retrieve the specified data object. If a valid token is received, then a response 1318 including the data object 1319 may be generated and sent to the appropriate location or access to the object is otherwise made available to the sender of the token.

Figure 14:
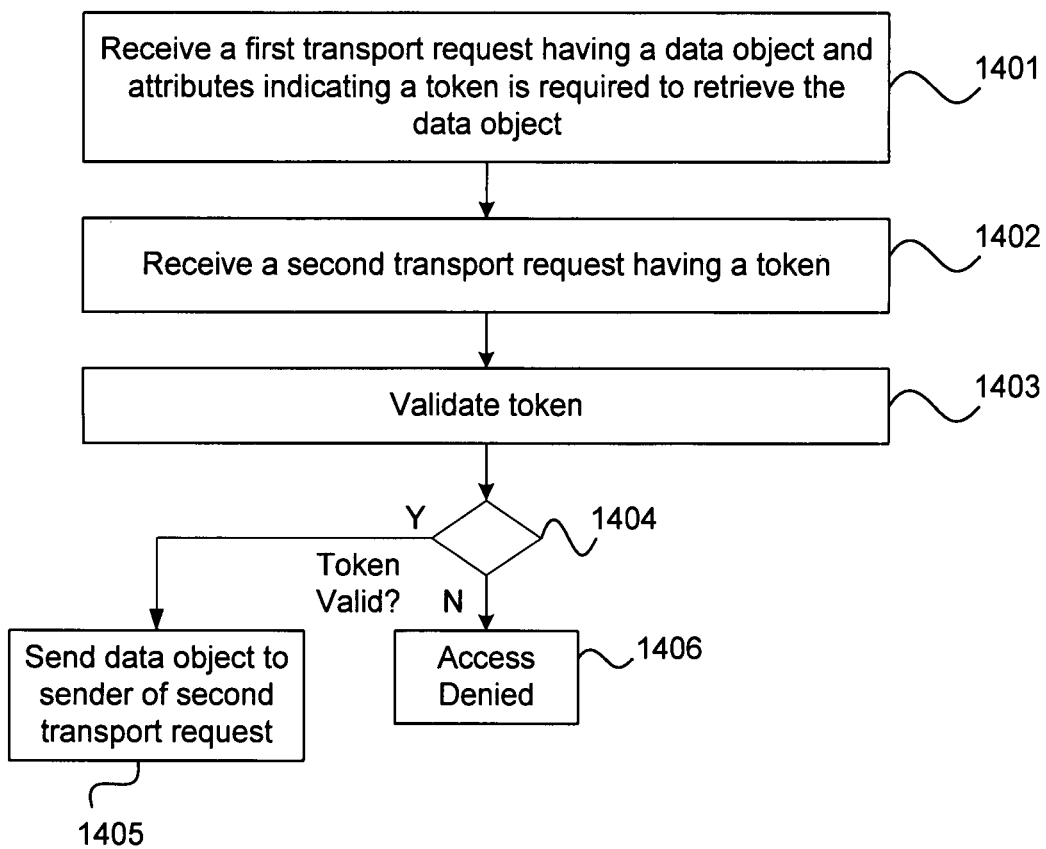
FIG. 14 illustrates method of exchanging information according to another embodiment of the present invention.

FIG. 14 illustrates method of exchanging information according to another embodiment of the present invention. At 1401, a first transport request is received having a data object and attributes indicating a token is required to retrieve the data object. It is to be understood that tokens according the different embodiments may be specified in a variety of ways. For example, a token may be single computer element or multiple computer elements. In some embodiments, the entire token may be provided in a transport request. In other embodiments, only part of a token (e.g., a link) may be provided in a transport request, and other portions of the token may be accessed as part of the validation process, for example, or as part of the consumption process described below. At 1402, a second transport request having a token is received. In this example, the intermediate step of accessing a list of available data objects has been omitted, and the second transport request provides the token for retrieving the data object. It is to be understood that some embodiments of the invention described herein and above, or various combinations thereof, may include accessing a list of objects available for retrieval, but not all embodiments may perform this step. At 1403, the token is validated. If the token is valid at 1404, then the data object may be sent to the sender of the second transport request at 1406. However, if the token is not validated, then the system may not send back the data object (e.g., access may be denied).

Figure 15:
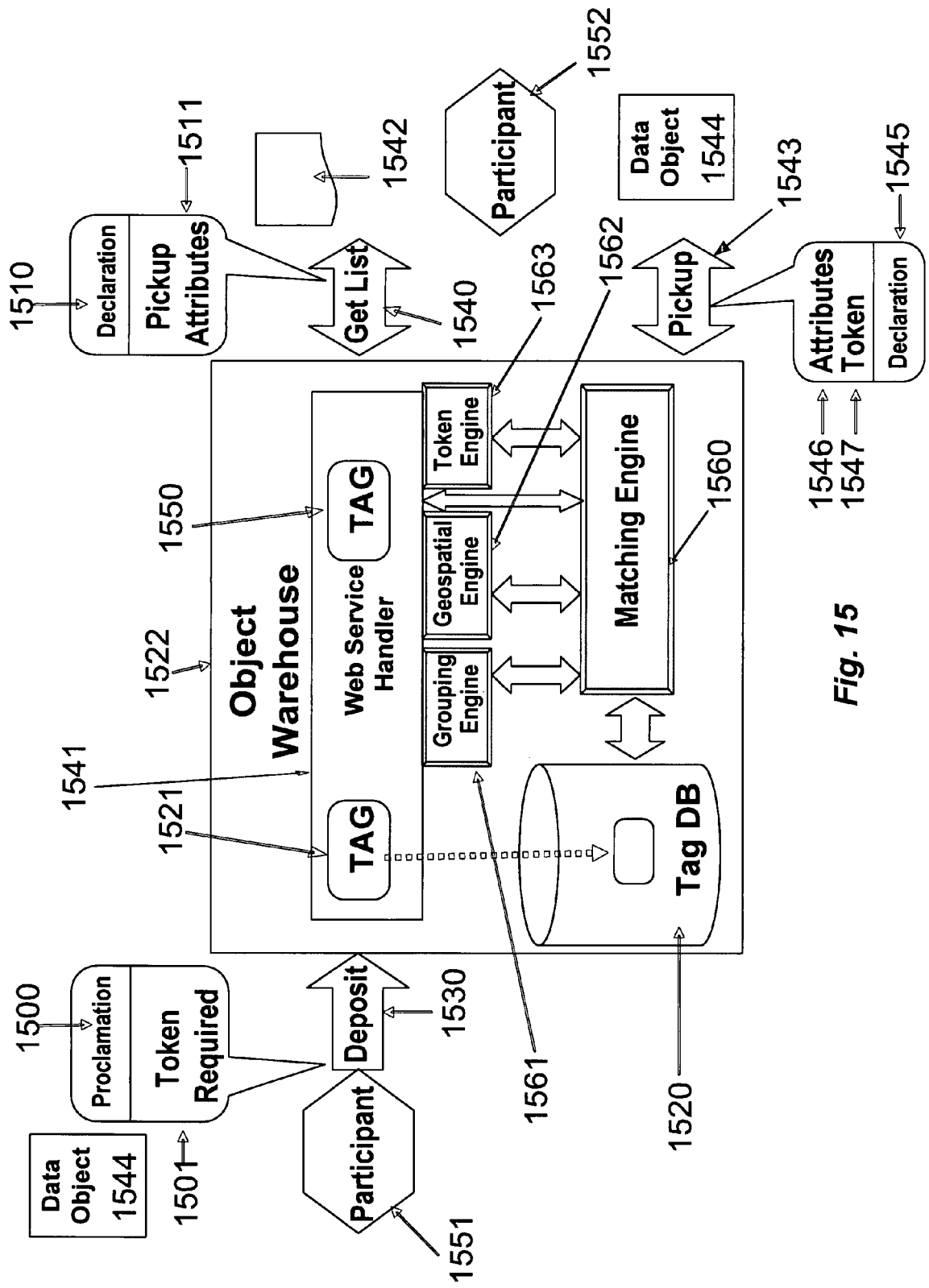
FIG. 15 illustrates an example of exchanging information using tokens according to another embodiment of the present invention.

FIG. 15 illustrates an example of exchanging information using tokens according to another embodiment of the present invention. Embodiments of the present invention include an object warehouse that allows a proclamation to require the pickup participant to deliver a token when requesting to pickup a data object. Furthermore, some embodiments include secure OW tokens that may be created and consumed exclusively by the OW. Accordingly, in such an application, a participant may be required to possess and surrender a token in order to pickup an object. Additionally, in some embodiments, OW tokens may be inventoried and/or distributed by controlling authorities outside the OW. Some tokens may only be used once, and others may be used a specified or unlimited number of times.

The following is an example of how a data object may be deposited in an object warehouse with a token pickup requirement. A data object 1544 is delivered to the OW 1522 by a depositing participant 1551 with a deposit instruction 1530 along with a proclamation 1500 that contains attributes 1501 indicating that a token will be required for picking up the object. The proclamation 1500 is processed by the OW's web service handler 1541, processed by any engines (e.g., plug-in grouping engine 1561 and/or geospatial engine 1562), and a tag 1521 is formed and stored in the tag DB 1520. In this example, the proclamation contains token required attributes 1501. Thus, this example uses a token engine 1563 to process the proclamation attributes. The resulting token information is stored along with the tag 1521 in the tag DB 1520.

Some time later, a pickup participant 1552 delivers a GetList instruction 1540 to the OW 1522 along with a declaration 1510 that includes all appropriate pickup attributes 1511 (e.g., attributes such as matching, geometric, grouping, and/or aliasing) of the pickup participant. The web service handler 1541 and any relevant engines may process the declaration 1510 to produce a tag 1550. The results, along with the pickup participant tag 1550, are sent to the matching engine 1560. Then, the OW uses matching engine 1560 to execute a Lookup for all the tags in the tag DB 1522 that match the pickup participant's tag 1550. The OW then sends back a list 1542 of objects, which may be prioritized, eligible for this participant 1552 to pickup. Entries in the list 1542 which require tokens to pickup may be noted in the list. In one embodiment, a pointer or other access mechanism to a Token Authority may also be provided. For example, in one embodiment, each data object in the list of eligible objects may include an indication of its token requirements and a pointer to the controlling authority responsible for distributing the tokens for that object if they are required. Token Authorities, which are described in more detail below, may be used to issue tokens. In some example embodiments, a pickup participant may be required access a Token Authority to obtain a token prior to pickup. For example, a participant may follow a link to the Token Authority provided in the list to pickup a token. The pickup participant can then present this token when returning to pickup the object. However, other embodiments may have other techniques for distributing tokens to participants.

An example of retrieving a data object may proceed as follows. A participant 1552 may deliver a pickup instruction 1543 to the OW 1522 along with a declaration 1545 containing pickup attributes 1546, a token 1547, and the index or some other locator for the object to be picked up (taken from a previous GetList reply). The OW's web service handler 1541, and any plug-in engines included in the system such as a grouping engine 1561, geospatial engine 1562, or token engine 1563, process the request and produce another tag 1550. The web service handler 1541 may send the tag 1550 and the object index to the matching engine 1560. The matching engine 260 may verify that the object is still eligible for pickup by this participant 1552. If eligible, and if a token is required, the token engine 1563 may validate the participant's token 1547. If the token 1547 is valid the object 1542 is sent back to the requesting pickup participant 1552. The participant's token may, in some applications, be consumed in the process of picking up the data object. A record of this transaction may further be recorded in the OW tracking log for later report generation participant 1552 can request a transaction report from the OW 1522 that will provide the details of this object pickup event.

Figure 16:
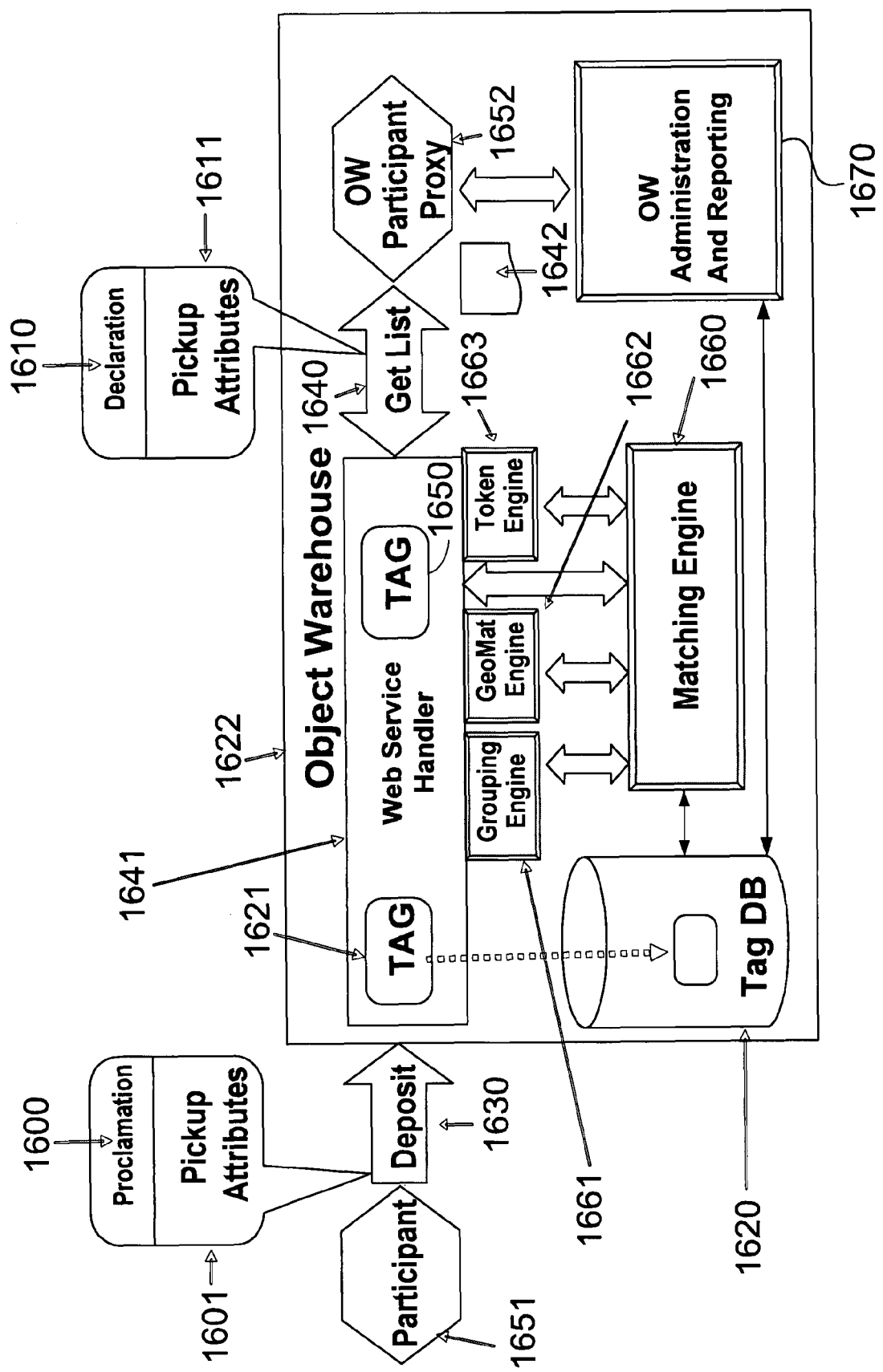
FIG. 16 illustrates an example object warehouse using tokens according to another embodiment of the present invention.

FIG. 16 illustrates an example object warehouse using tokens according to another embodiment of the present invention. This example illustrates one technique for managing tokens. For example, tokens may be created and distributed for use by a participant in retrieving a data object. There are a variety of schemes available for token based or token like exchanges. This example illustrates a private OW token mechanism. For example, the OW may be based on a Public Key Infrastructure ("PKI"). Here, the OW may create tokens for a Token Authority linked to a data object deposited in the OW. The Token Authority may, for example, take possession of the tokens and distributes them according to their own distribution policy. In some applications, the same Token Authority can be used for several objects, and a different token may be required for picking up different objects or the same token can be used for picking up any one of a number of different objects. Additionally, in different embodiments, a Token Authority may give tokens away for free, charge for them, pace the distribution over time or over participant, or otherwise distribute the tokens according to any algorithm or process desired. In some applications, each token may only be used once to pickup an object, hence, it is consumed when used. Any attempt to reuse a consumed token may be invalid, and the pickup request would be denied. Alternatively, a multi-session pickup may be used. For instance, if an object is large or the connection to the OW is broken before the entire object is picked up, the remainder of the object is allowed to be picked up using the same token used to start the transfer. In such a case, the token may not be fully consumed until the object is successfully transferred to the participant. Reports are available from the OW to the Token Authority that detail the tokens consumed and the objects delivered.

The following is an example of creating tokens. In one embodiment, creating tokens is accomplished by sending a request to the OW to create a number of tokens. For example, an OW may create from 1 to 256 tokens per request. In this example, if more than 256 tokens are needed the Token Authority can just send multiple requests. Communications between the OW and the Token Authority may be just like exchanging information between participants. For example, as illustrated in FIG. 16, OW 1622 may be a participant depositing and/or picking up objects from the same or different OW as a participant. In one embodiment, this is accomplished using an OW participant proxy 1652, for example. For example, participant 1651 may be acting as a Token Authority and sends an instruction to deposit 1630 an object in the OW 1622. The accompanying proclamation 1600 contains pickup attributes 1601 indicating that the OW 1622 is eligible to pickup this object. The object is a request to create one or more tokens. In one embodiment, the OW's web service handler 1641 and any plug-in engines process proclamation 1600 to produce a tag 1621. The tag 1621 and any output from the plug-in engines are placed into the tag DB 1620.

Periodically, the OW participant proxy 1652 wakes up and sends a GetList 1640 instruction to the OW's web service handler 1641. Proxy 1652 may looking for one or more work request objects with corresponding tags that have been stored in the tag DB 1620. The web service handler 1641 and optionally plug-in engines 1661, 1662, 1663 process declaration 1610 to produce the pickup participant tag 1650. The tag and plug-in engine output are sent to the matching engine 1660 to look for matching tags in the tag DB 1620. A list of eligible objects is returned to the pickup participant, which in this case is the OW proxy 1652. If an object is available for pickup by the proxy, the OW participant proxy 1652 receives a non-empty list 1642 and sends the list to the OW administration process 1670. The administration process 1670 may be one or more software components for performing object warehouse system functions including token creation or rule management, for example. The OW administration process 1670 works through the object list 1642 and asks the OW participant proxy 1652 to issue pickup instructions for the objects to be retrieved from the OW object repository to the administration process. The object is picked up and returned to the OW administration process 1670 for processing. For a "create token" command, the requested number of tokens are generated. The tokens may be serialized and each signed with the OW's private key, for example. Accordingly, using keys, tokens can be validated by using the OWs public key. The requested number of tokens may be returned to the requesting participant 1651 using the OW's using a similar deposit and pickup technique, for example. The "create token" command may also include the Token Authorities PKI Certificate. Distributed tokens may accordingly be cosigned by the Token Authority and this Certificate will be used by the OW later to determine the authenticity of tokens it is presented.

Distribution and use of the tokens may proceed as follows. A Token Authority may pickup as many tokens as it needs from the OW in response to a "create token" request using the deposit and pickup techniques described above. The Token Authority can then distribute these tokens to any entity and under any criteria desired. The tokens are then validated by the OW when used. For example, in some embodiments, in order for the tokens to be valid they must be cosigned by the Token Authority when presented to the OW. If the token is not properly cosigned by the Token Authority or the token has already been consumed, then such token will be invalid. In some applications, tokens may not expire over time. In other embodiments, tokens may expire after some predetermined time period (e.g., for promotions). Once a token is presented to the OW, it may be validated. In some applications, validation may be used to insure that the OW signature is valid and that the cosigning Token Authority is valid. In other applications, a wide variety of other validation techniques may be used. Once a token is validated and is being used to pick up an object, the token may be marked as "in-use" or "active", for example. In some embodiments, the token may include a serial number which is marked as "in-use" when the token is in the process of a pickup. Tokens "in-use" may be used repeatedly to continue to pickup a single object if such object's pickup was begun using this token. In one embodiment, no new pickups may be possible with an "in-use" token. Once the complete object has been picked up the token may be marked as "consumed" or "invalid." Such a token may no longer be used to pickup or continue to pickup any object from the OW. The OW may track each token by a unique serial number which is never reused, for example. The design of the OW token may be used to support commerce that may involve actual monetary equivalents. Hence, in some applications it may be important not to allow fraudulent reuse or distribution of elements of commerce. Tokens are also flexible enough to embody several monetary standards such as Internet billing units or different national currencies.

EXAMPLE 6

Reporting

In some embodiments, an OW may keep complete logs of token exchange activities as well some or all of the other information exchanges described herein. For example, embodiments of the OW may support an administrative and reporting web service that allows participants to pickup individualized reports that detail the lifecycle of objects deposited and picked up from the OW over a period of time. These reports may provide a breakdown of the objects deposited and/or objects picked up by participants. They may also include time, group, class, and/or geometric information so that participants can plan future information delivery options according to previous activity, for example. These reports can also be used to provide a business workflow learning activity. This learning can actually be incorporated into model driven processes in a dynamic fashion. For example, model driven business processes may have a definition that includes a flow and exchange of information. Reports from the OW may be used to dynamically adjust the business model based on actual information flow, for example. The adjusted model may be used to adjust the software running the business process, which results in a dynamically changing business process. Additionally, reporting may be used for tracking token activities. For example, the reporting component of the OW may be used to construct a token lifecycle report for each and every token if desired. It is also possible to know the status of all tokens at any time. The Token Authority can return undistributed tokens to the OW at any time, effectively taking token sequence numbers out of circulation.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, some advantages of some of the embodiments described above include, but are not limited to, one or more of the following: sending and receiving objects across different networks, sending and receiving objects across networks with different network protocols, sending and receiving objects between systems that may have intermittent connectivity, such as a vehicle, or dynamically changing the rules specifying how data objects are processed to name just a few. In one embodiment, the OW described above does not access the content of the data objects that are received and stored in the OW. Accordingly, some embodiments of the OW may use only the attributes of the transport requests (e.g., proclamations and declarations) that accompany each OW transaction, such as deposit and pickup communications, to exchange the data objects between participants. Similarly, in some embodiments, attribute information in the transport requests may not be transferred between participants with the data objects. Accordingly, in some embodiments, the data objects are completely logically partitioned from the associated attribute information. Based on the above disclosure and the following claims, other advantages, arrangements, embodiments, implementations, and equivalents will be evident to those skilled in the art and may be employed without departing from the spirit and scope of the invention as defined by the claims.

What is claimed is:

1. A method of exchanging information comprising:
    receiving a first transport request comprising a data object and first attribute information describing a recipient of the data object;
    storing the data object;
    generating a first tag comprising the first attribute information;
    associating the first tag with the data object;
    storing the first tag;
    receiving a second transport request comprising second attribute information describing a sender of the second transport request;
    generating a second tag comprising the second attribute information;
    comparing at least a portion of the second attribute information to the first attribute information; and
    sending the data object to the sender of the second transport request if at least a portion of the second attribute information matches at least a portion of the first attribute information.

2. The method of claim 1 wherein the first attribute information comprises first name information and the second attribute information comprises second name information.

3. The method of claim 2 wherein the first and second name information comprise a name and a name form.

4. The method of claim 3 wherein the name and the name form are encoded.

5. The method of claim 2 further comprising associating an alias list comprising third name information with the first tag, the method further comprising:
    comparing the second name information in the second tag to the third name information in the alias list; and
    sending the data object to the sender of the second transport request if the second name information matches the third name information.

6. The method of claim 1 further comprising transforming the first attribute information from a first format in said first transport request to a second format in said first tag.

7. The method of claim 1 further comprising transforming the second attribute information from a first format in said second transport request to a second format in said second tag.

8. The method of claim 1 wherein the first attribute information comprises one or more group attributes, the method further comprising accessing group information using the group attributes, the group information comprising a plurality of recipients, and generating a tag for each recipient specified in the group information.

9. The method of claim 1 wherein the first and second attribute information comprises geospatial information.

10. The method of claim 9 further comprising processing the first and second attribute in a geospatial software component.

11. The method of claim 1 wherein the first attribute information comprises information indicating that a token is required to retrieve the data object.

12. The method of claim 11 further comprising validating a token, wherein the data object is sent only if a token is received and validated.

13. A non-transitory computer-readable medium containing instructions for controlling a computer system to perform a method, the method comprising:
    receiving a first transport request comprising a data object and first attribute information describing a recipient of the data object;
    storing the data object;
    generating a first tag comprising the first attribute information;
    associating the first tag with the data object;
    storing the first tag;
    receiving a second transport request comprising second attribute information describing a sender of the second transport request;
    generating a second tag comprising the second attribute information;
    comparing at least a portion of the second attribute information to the first attribute information; and
    sending the data object to the sender of the second transport request if at least a portion of the second attribute information matches at least a portion of the first attribute information.

14. The non-transitory computer-readable medium of claim 13 wherein the first attribute information comprises first name information and the second attribute information comprises second name information.

15. The non-transitory computer-readable medium of claim 14 wherein the first and second name information comprise a name and a name form.

16. The non-transitory computer-readable medium of claim 15 wherein the name and the name form are encoded.

17. The non-transitory computer-readable medium of claim 14 further comprising associating an alias list comprising third name information with the first tag, the method further comprising:
    comparing the second name information in the second tag to the third name information in the alias list; and
    sending the data object to the sender of the second transport request if the second name information matches the third name information.

18. The non-transitory computer-readable medium of claim 13 further comprising transforming the first attribute information from a first format in said first transport request to a second format in said first tag.

19. The non-transitory computer-readable medium of claim 13 wherein the first or second transport requests are received from a vehicle.

20. The non-transitory computer-readable medium of claim 13 wherein the first attribute information comprises one or more group attributes, the method further comprising accessing group information using the group attributes, the group information comprising a plurality of recipients, and generating a tag for each recipient specified in the group information.

21. The non-transitory computer-readable medium of claim 13 wherein the first and second attribute information comprises geospatial information.

22. The non-transitory computer-readable medium of claim 21 further comprising processing the first and second attribute in a geospatial software component.

23. The non-transitory computer-readable medium of claim 13 wherein the first attribute information comprises information indicating that a token is required to retrieve the data object.

24. The non-transitory computer-readable medium of claim 23 further comprising validating a token, wherein the data object is sent only if a token is received and validated.

* * * * *